US011879827B2

(12) United States Patent
Berezhna et al.

(10) Patent No.: US 11,879,827 B2
(45) Date of Patent: Jan. 23, 2024

(54) METHODS FOR MODULATION AND SYNCHRONOUS DETECTION IN A FLOW CYTOMETER AND SYSTEMS FOR SAME

(71) Applicant: Becton, Dickinson and Company, Franklin Lakes, NJ (US)

(72) Inventors: Svitlana Berezhna, Los Gatos, CA (US); Ihor V. Berezhnyy, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 17/178,812

(22) Filed: Feb. 18, 2021

(65) Prior Publication Data

US 2021/0341379 A1   Nov. 4, 2021

Related U.S. Application Data

(60) Provisional application No. 63/017,365, filed on Apr. 29, 2020.

(51) Int. Cl.
*G01N 15/14* (2006.01)
(52) U.S. Cl.
CPC ..... *G01N 15/1436* (2013.01); *G01N 15/1429* (2013.01)
(58) Field of Classification Search
CPC ........... G01N 15/1429; G01N 15/1434; G01N 15/1436
See application file for complete search history.

(56) References Cited

U.S. PATENT DOCUMENTS

| 4,884,886 A | * | 12/1989 | Salzman | ............... G01N 21/21 356/367 |
| 5,515,163 A | | 5/1996 | Kupershmidt | |
| 2008/0221711 A1 | | 9/2008 | Trainer et al. | |
| 2009/0122311 A1 | | 5/2009 | Masahiko | |

(Continued)

FOREIGN PATENT DOCUMENTS

WO   WO-9313706 A2 * 7/1993   ......... A61B 5/14535

OTHER PUBLICATIONS

Bhattacharyya, Sabyasachi, et al. "Implementation of digital lock-in amplifier." Journal of Physics: Conference Series. vol. 759. No. 1. IOP Publishing, 2016. (Year: 2016).*

(Continued)

*Primary Examiner* — Rufus L Phillips
(74) *Attorney, Agent, or Firm* — Khin K. Chin; Bret E. Field; BOZICEVIC, FIELD & FRANCIS LLP

(57) ABSTRACT

Methods for determining a parameter of a particle in a flow stream (e.g., in a particle analyzer of a flow cytometer) from scattered light are described. Methods according to certain embodiments include irradiating a particle in a flow stream with a frequency-modulated beam of laser light modulated at a reference frequency, detecting scattered light from the particle with a photodetector, generating a frequency-encoded data signal from the detected scattered light, synchronizing the frequency-encoded data signal with the reference frequency and determining one or more parameters of the particle based on the synchronized frequency-encoded data signal. Systems and non-transitory computer readable storage medium with instructions for practicing the subject methods are also provided.

14 Claims, 10 Drawing Sheets

(56) References Cited

U.S. PATENT DOCUMENTS

| | | | |
|---|---|---|---|
| 2011/0168917 A1* | 7/2011 | Doi | G01N 15/1429 |
| | | | 250/214 R |
| 2016/0238510 A1* | 8/2016 | Bachalo | G01N 15/1429 |
| 2017/0176318 A1 | 6/2017 | Scarcelli et al. | |
| 2017/0268981 A1* | 9/2017 | Diebold | G01N 15/1429 |
| 2019/0226989 A1 | 7/2019 | Karpf et al. | |
| 2019/0234863 A1 | 8/2019 | Diebold et al. | |
| 2019/0360912 A1 | 11/2019 | Sharpe et al. | |
| 2020/0240896 A1* | 7/2020 | Karasikov | G01N 15/1459 |

OTHER PUBLICATIONS

Carlsson, "Signal-to-Noise Ratio for Confocal Microscopy when Using the Intensity-Modulated Multiple-Beam Scanning (IMS) Technique", Micron, vol. 26, No. 4, pp. 317-322, 1995.

* cited by examiner

METHODS FOR MODULATION AND SYNCHRONOUS DETECTION IN A FLOW CYTOMETER AND SYSTEMS FOR SAME

CROSS-REFERENCE TO RELATED APPLICATION

This application is related to U.S. Provisional Patent Application Ser. No. 63/017,365 filed Apr. 29, 2020; the disclosure of which application is herein incorporated by reference.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. To quantify these variations, the light is collected and directed to the surface of a detector.

One technique that utilizes light detection to characterize the components in a sample is flow cytometry. Using data generated from the detected light, properties of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include methods for determining a parameter of a particle (e.g., cells in a biological sample) in a flow stream from scattered light. Methods according to certain embodiments include irradiating a particle in a flow stream with a frequency-modulated beam of laser light modulated at a reference frequency, detecting scattered light from the particle with a photodetector, generating a frequency-encoded data signal from the detected scattered light, synchronizing the frequency-encoded data signal with the reference frequency and determining one or more parameters of the particle based on the synchronized frequency-encoded data signal. Systems and non-transitory computer readable storage medium with instructions for practicing the subject methods are also provided.

In embodiments, a particle in a flow stream is irradiated with frequency-modulated laser light. In some embodiments, methods include generating the frequency modulated light by irradiating an optical modulator with one or more lasers to generate beams of frequency-modulated light. In some embodiments, the optical modulator is an electro-optical modulator. In certain embodiments, the electro-optical modulator is a piezo optic modulator. In other embodiments, the optical modulator is an acousto-optic modulator. In some instances, generating the frequency-modulated laser light includes irradiating the optical modulator with the laser through an input polarizer to generate a polarized frequency-modulated beam of laser light. In embodiments, a reference frequency signal is generated (e.g., with a controller) and communicated to the optical modulator. In some embodiments, the optical modulator is configured to generate the reference frequency. In some embodiments, the frequency-modulated laser light has an oscillating frequency at the reference frequency.

In embodiments, scattered light is detected with one or more scatter photodetectors. In some embodiments, light is detected with a side scatter photodetector. In other embodiments, light is detected with a forward scatter photodetector. In yet other embodiments, light is detected with a back scatter photodetector. In some embodiments, scattered light is conveyed through an output polarizer to the scatter photodetector. In some instances, the scattered light is conveyed through a quarter wave plate to the scatter photodetector. In certain instances, the scattered light is conveyed through a quarter waveplate and an output polarizer to the scatter photodetector. In certain embodiments, scattered light is detected in two different detector channels. In some instances, the scattered light is detected in two different side scatter detector channels. In some embodiments, the side scatter detector channels include a first polarizer having a first polarization and a second polarizer having a second polarization that is perpendicular to the first polarization.

A frequency-encoded data signal is generated by the photodetector in response to the detected scattered light. In some embodiments, generating the frequency-encoded data signal includes detecting the amplitude of light scattered by the particle that is oscillating at the reference frequency. In some embodiments, the reference frequency is a reference waveform. In embodiments, the frequency-encoded data signal is synchronized with the reference frequency signal. In some embodiments, synchronizing the frequency-encoded data signal with the reference frequency signal includes multiplying the frequency-encoded data signal with the reference waveform. In certain embodiments, the frequency-encoded data signal is synchronized with the reference frequency signal with a lock-in amplifier. In some instances, lock-in amplification is implemented on a field programmable gate array (FPGA). In other embodiments, the frequency-encoded data signal with the reference frequency signal is digitally synchronized, such as where the particle analyzer includes a processor having memory operably coupled to the processor where the memory includes instructions stored thereon, which when executed by the processor, cause the processor to multiply the frequency-encoded data signal with the reference waveform. In some embodiments, lock-in amplification includes applying a low-pass filter to the synchronized frequency-encoded data signal to generate a data signal profile. In some instances, the data signal profile generated by applying the low-pass filter has a Gaussian signal profile. In other instances, the data signal profile generated by applying the low-pass filter has a super-Gaussian signal profile.

In some embodiments, one or more of the synchronized frequency-encoded data signal and the generated data signal profile is used to determine one or more parameters of the particle in the flow stream. In some instances, methods include identifying the particle in the flow stream based on the determined parameters. In other instances, methods include sorting the particle.

Aspects of the present disclosure also include systems for determining one or more parameters of a particle in a flow stream. Systems according to certain embodiments include a light source having a laser and an optical modulator component configured to generate a frequency-modulated beam of laser light at a reference frequency, a light detection system having a light scatter photodetector and a processor with memory operably coupled to the processor where the memory includes instructions stored thereon, which when executed by the processor cause the processor to generate a frequency-encoded data signal from the detected scattered light, synchronize the frequency-encoded data signal with the reference frequency and determine one or more parameters of the particle based on the synchronized frequency-encoded data signal. In some embodiments, the system is a particle analyzer, such as a particle analyzer that is incorporated into a flow cytometer. In some embodiments, the system includes a particle sorter for sorting one or more particles from the flow stream.

In embodiments, systems include an optical modulator for generating a frequency-modulated beam of light by the laser. In In some embodiments, the optical modulator is an electro-optical modulator. In certain embodiments, the electro-optical modulator is a piezo optic modulator. In other embodiments, the optical modulator is an acousto-optic modulator. In some embodiments, the light source includes an input polarizer for polarizing the beam of laser light before irradiation of the optical modulator. In some embodiments, systems include a controller for applying frequency drive signals to the optical modulator. In some embodiments, the controller is configured to apply a reference frequency drive signal to the optical modulator. In other embodiments, the optical modulator is configured to generate the reference frequency.

Systems include a light detection system having one or more photodetectors for detecting scattered light. In some embodiments, the photodetectors are configured to detect side scattered light. In other embodiments, the photodetectors are configured to detect front scattered light. In yet other embodiments, the photodetectors are configured to detect back scattered light. In some instances, the light detection system includes an output polarizer in optical communication with the photodetector. In these embodiments, scattered light is conveyed through the output polarizer to the scatter photodetector. In certain embodiments, the output polarizer component further includes a quarter waveplate. In some embodiments, the light detection system includes two different detector channels. In some instances, the light detection channel includes two different side scatter detector channels. In some embodiments, the side scatter detector channels include a first polarizer having a first polarization and a second polarizer having a second polarization that is perpendicular to the first polarization.

The photodetectors of the subject light detection systems are configured to generate a frequency-encoded data signal in response to the detected scattered light. In some embodiments, the photodetectors are configured to detect the amplitude of scattered light that is oscillating at the reference frequency generated by the controller or optical modulator. In some embodiments, the controller is configured to generate a reference frequency waveform. In embodiments, the frequency-encoded data signal is synchronized with the reference frequency signal. In some embodiments, systems include a processor that includes memory operably coupled to the processor where the memory has instructions stored thereon, which when executed by the processor, cause the processor to: detect the amplitude of light scattered by the particle that is oscillating at the reference frequency and multiply the frequency-encoded data signal with the reference waveform. In some embodiments, systems include a lock-in amplifier in operational communication with the controller and photodetector which is configured to synchronize the frequency-encoded data signal with the reference waveform. In some embodiments, systems include an FPGA having programming to conduct the lock-in amplification. In other embodiments, the memory includes instructions stored thereon to digitally synchronize the frequency-encoded data signal with the reference waveform. In certain embodiments, systems are configured to apply a low-pass filter with the lock-in amplifier or digitally apply the low-pass filter to the synchronized frequency-encoded data signal. Applying a low-pass filter to the synchronized frequency-encoded data signal in certain instances generates a data signal profile, such as a Gaussian data signal profile or a super Gaussian data signal profile.

Aspects of the present disclosure also include a non-transitory computer readable storage medium for practicing the subject methods. Non-transitory computer readable storage media according to certain embodiments include algorithm for irradiating a particle in a flow stream with a frequency-modulated beam of laser light modulated at a reference frequency, algorithm for detecting scattered light from the particle with a photodetector, algorithm for generating a frequency-encoded data signal from the detected scattered light, algorithm for synchronizing the frequency-encoded data signal with the reference frequency and algorithm for determining one or more parameters of the particle based on the synchronized frequency-encoded data signal.

In some embodiments, the non-transitory computer readable storage medium includes algorithm for irradiating an electro-optical modulator with a laser to generate the frequency-modulated beam of laser light. In some instances, the non-transitory computer readable storage medium includes algorithm for irradiating the electro-optical modulator with the laser through an input polarizer to generate a polarized frequency-modulated beam of laser light. In some embodiments, the non-transitory computer readable storage medium includes algorithm for generating a reference frequency signal. In some embodiments, the non-transitory computer readable storage medium includes algorithm for generating a reference frequency waveform.

In embodiments, the non-transitory computer readable storage medium includes algorithm for synchronizing the frequency-encoded data signal with the reference frequency. In some embodiments, the non-transitory computer readable storage medium includes algorithm for synchronizing the frequency-encoded data signal with the reference frequency by multiplying the frequency-encoded data signal with the reference frequency waveform. In some instances, the non-transitory computer readable storage medium includes algorithm for synchronizing the frequency-encoded data signal with the reference frequency with a lock-in amplifier. In other embodiments, the non-transitory computer readable storage medium includes algorithm for digitally synchronizing the frequency-encoded data signal, such as with an FPGA having programming for multiplying the frequency-encoded data signal with the reference frequency waveform. In some embodiments, the non-transitory computer readable storage medium includes algorithm for applying a low-pass filter to the synchronized frequency-encoded data signal to generate a data signal profile. In some instances, the data signal profile generated by applying the low-pass filter has a Gaussian signal profile. In other instances, the data signal profile generated by applying the low-pass filter has a super-Gaussian signal profile.

Kits including one or more components of the subject systems are also provided. Kits according to certain embodiments include one or more lasers and an optical modulator. In some embodiments, kits include an electro-optic modulator, such as a piezo optic modulator. In some embodiments, kits also include one or more light polarizers. In other embodiments, kits include a quarter waveplate. In some embodiments, kits may include one or more photodetectors. In some instances, the kits include a lock-in amplifier. In certain embodiments, kits include an integrated circuit device programmed to perform the lock-in amplification, such as to synchronize the frequency-encoded data signal with the reference frequency. In some embodiments, the integrated circuit device is a field programmable gate array (FPGA). In other embodiments, the integrated circuit device is an application specific integrated circuit (ASIC). In still other embodiments, the integrated circuit device is a complex programmable logic device (CPLD). In certain embodiments, the subject kits may also include a light collection component for propagating light from the flow stream to the photodetector, such as lenses, mirrors or fiber optics.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1A:
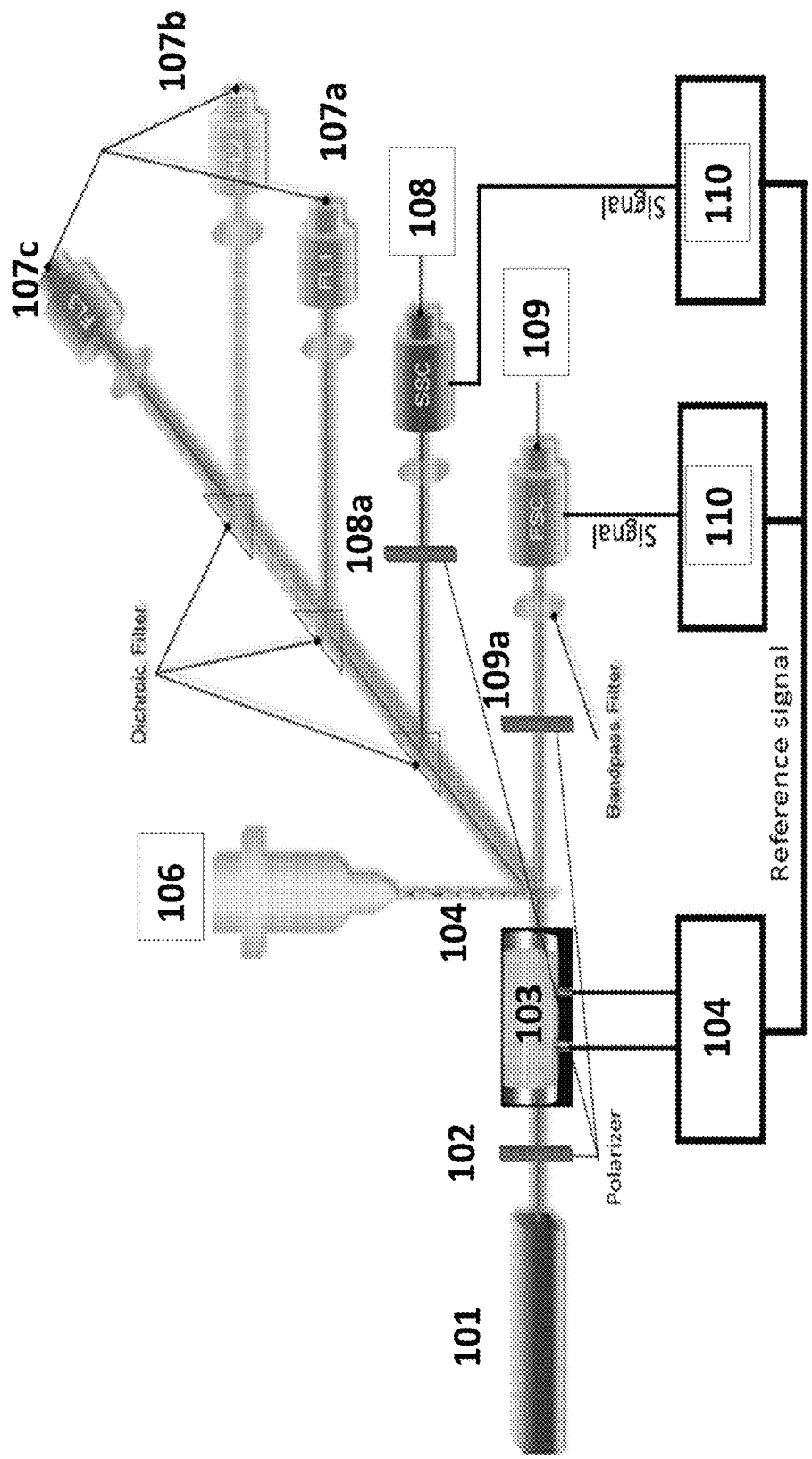
FIG. 1A depicts a particle analyzer according to certain embodiments.

Methods for determining a parameter of a particle in a flow stream (e.g., in a particle analyzer of a flow cytometer) from scattered light are described. Methods according to certain embodiments include irradiating a particle in a flow stream with a frequency-modulated beam of laser light modulated at a reference frequency, detecting scattered light from the particle with a photodetector, generating a frequency-encoded data signal from the detected scattered light, synchronizing the frequency-encoded data signal with the reference frequency and determining one or more parameters of the particle based on the synchronized frequency-encoded data signal. Systems and non-transitory computer readable storage medium with instructions for practicing the subject methods are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for determining a parameter a particle (e.g., cells in a biological sample) in a flow stream from detected scattered light. In further describing embodiments of the disclosure, methods for irradiating a particle in a flow stream with a frequency-modulated beam of laser light modulated at a reference frequency, detecting scattered light from the particle with a photodetector, generating a frequency-encoded data signal from the detected scattered light and synchronizing the frequency-encoded data signal with the reference frequency are described first in greater detail. Next, systems having a laser, an optical modulator, a scatter detector and a controller for synchronizing a frequency-encoded data signal with a reference frequency signal are described. Non-transitory computer readable storage medium with instructions for practicing the subject methods are also provided.

Methods for Determining a Parameter of a Particle in an Irradiated Sample in a Flow Stream Aspects of the disclosure also include methods for determining a parameter of a particle from scattered light of an irradiated flow stream. In practicing methods according to certain embodiments, a sample having particles (e.g., a biological sample having cells) is irradiated in a flow stream with a modulated beam of laser light. The term "modulated" is used herein in its conventional sense to refer to imposing a change to one or more properties of a beam of laser light, such as the phase, frequency, amplitude or polarization of the laser beam. As summarized above, methods according to the present disclosure include irradiating the sample in the flow stream with a frequency-modulated beam of laser light. Any convenient protocol can be used to modulate the frequency of the laser beam, such as where the beam of laser light is frequency-modulated by irradiating and passing laser light through an optical modulator. In some embodiments, the modulator is an electro-optic modulator. In some instances, the electro-optic modulator includes a component (e.g., a nonlinear optical material such as a non-linear organic polymer or a crystalline lithium niobate) that changes a refractive index in response to application of a direct current and irradiating the electro-optic modulator with the laser is sufficient to output a frequency-modulated beam of light from the laser. In other instances, the electro-optic modulator includes a component that changes a refractive index in response to application of a low-frequency electric field and irradiating the electro-optic modulator with the laser is sufficient to output a frequency-modulated beam of light from the laser. In certain embodiments, methods include generating a frequency-modulated beam of laser light by irradiating an acousto-optic modulator such as a piezo optic modulator with the laser.

As described in greater detail below, in some embodiments the optical modulator is operationally coupled to a controller that communicates a frequency signal to the optical modulator to generate the frequency-modulated beam of laser light. The frequency applied in generating the frequency-modulated beam of laser light may vary, such as ranging from an oscillating frequency of about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, the controller is configured to apply an electric current or electric field to the optical modulator. In certain embodiments, the controller is configured with an electric pulse generator. In other embodiments, the controller is configured to apply a radiofrequency drive signal, such as where the controller includes a direct digital synthesizer (DDS) or an arbitrary waveform generator (AWS). In some embodiments, methods include generating a reference frequency signal waveform with the controller. The generated reference frequency signal waveform according to certain embodiments has an oscillating frequency that ranges, such as from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, the optical modulator is irradiated with the laser through an input polarizer to generate a polarized beam of frequency-modulated laser light. The term "polarizer" is used herein in its conventional sense to refer to an optical adjustment component that is configured to pass light having a predetermined polarization and blocking light waves having other polarizations. The input polarizer may be any convenient optical polarizer, including but not limited to, a linear polarizer, an absorptive polarizer, a beam-splitting polarizer, a birefringent polarizer, a thin film polarizer, a wire grid polarizer, a circular polarizer and an optical polarizer configured for polarization by Fresnel reflection. The laser light may be passed through one or more input polarizers before being conveyed through the optical modulator, such as 2 or more, such as 3 or more, such as 4 or more and including 5 or more input polarizers. The input polarizer may be irradiated with the laser from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle of irradiation may also vary, ranging from 10° to 90° with respect to the planar surface of the polarizer, such as from 15° to 85°, such as from 20° to 80°, such as from 25° to 75° and including from 30° to 60°, for example at a 90° angle.

In embodiments, methods include irradiating the optical modulator with a laser. Lasers of interest may include pulsed lasers or continuous wave lasers. The type and number of lasers used in the subject methods may vary and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF)

excimer laser, xenon chlorine (XeCl) excimer laser or xenon-fluorine (XeF) excimer laser or a combination thereof. In other instances, the methods include irradiating the optical modulator with a dye laser, such as a stilbene, coumarin or rhodamine laser. In yet other instances, methods include irradiating the optical modulator with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the optical modulator with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, methods include irradiating the optical modulator with a semiconductor diode laser, optically pumped semiconductor laser (OPSL), or a frequency doubled- or frequency tripled implementation of any of the above mentioned lasers.

Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The optical modulator may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the optical modulator with an array of lasers, such as an array having one or more gas lasers, one or more dye lasers and one or more solid-state lasers.

Where more than laser is employed, the optical modulator may be irradiated with the lasers simultaneously or sequentially, or a combination thereof. For example, the optical modulator may be simultaneously irradiated with each of the lasers. In other embodiments, the optical modulator is sequentially irradiated with each of the lasers. Where more than one laser is employed to irradiate the optical modulator sequentially, the time each laser irradiates the optical modulator may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the optical modulator is sequentially irradiated with two or more lasers, the duration the optical modulator is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the optical modulator device is sequentially irradiated by more than two (i.e., 3 or more) lasers, the delay between irradiation by each laser may be the same or different.

The optical modulator may be irradiated continuously or in discrete intervals. In some instances, methods include irradiating the optical modulator with the laser continuously. In other instances, the optical modulator is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the optical modulator may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating the sample with two or more beams of frequency shifted light. In these embodiments, a light beam generator component may be employed having a laser and an acousto-optic device (e.g., an acousto-optic modulator) for frequency shifting the laser light. In these embodiments, methods include irradiating the acousto-optic device with the laser (e.g., through an input polarizer as described above). Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the light source includes a light beam generator, such as those described in Diebold, et al. *Nature Photonics Vol.* 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In embodiments, the particles irradiated in the flow stream may be cells, such as where the sample in the flow stream is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, scattered light from the sample is detected with one or more photodetectors. In embodiments, the scatter photodetectors may be side scatter photodetectors, forward scatter photodetectors, back scatter photodetectors and combinations thereof. The term "light scatter" is used herein in its conventional sense to refer to the propagation of light energy from particles in the sample (e.g., flowing in a flow stream) that are deflected from the incident beam path, such as by reflection, refraction or deflection of the beam of light. In some embodiments, scattered light is not luminescence from a component of the particle (e.g., a fluorophore). In embodiments, scattered light according to the present disclosure is not fluorescence or phosphorescence. In certain embodiments, scattered light detected from particles in the flow stream includes Mie scattering. In other embodiments, scattered light detected from particles in the flow stream includes Rayleigh scattering. In still other embodiments, scattered light detected from particles in the flow stream includes Mie scattering and Rayleigh scattering.

In embodiments, the scattered light may be detected by each photodetector at an angle with respect to the incident beam of light irradiation, such as at an angle of 1° or more, such as 10° or more, such as 15° or more, such as 20° or more, such as 25° or more, such as 30° or more, such as 45° or more, such as 60° or more, such as 75° or more, such as 90° or more, such as 135° or more, such as 150° or more and including where the scattered light detector is configured to detect light from particles in the sample at an angle that is 180° or more with respect to the incident beam of light irradiation. In certain instances, the light scatter photodetectors include a side scatter photodetector, such as where the photodetector is positioned to detect scattered light that is propagated from 30° to 120° with respect to the incident beam of light irradiation, such as from 45° to 105° and including from 60° to 90°. In certain instances, the light scatter detector is a side scatter photodetector positioned at an angle of 90° with respect to the incident beam of light irradiation. In other instances, the light scatter detector is a forward scatter detector, such as where the detector is positioned to detect scattered light that is propagated from 120° to 240° with respect to the incident beam of light irradiation, such as from 100° to 220°, such as from 120° to 200° and including from 140° to 180° with respect to the incident beam of light irradiation. In certain instances, the light scatter detector is a front scatter photodetector positioned to detect scattered light that is propagated at an angle of 180° with respect to the incident beam of light irradiation. In yet other instances, the light scatter detector is a back scatter photodetector positioned to detect scattered light that is propagated from 1° to 30° with respect to the incident beam of light irradiation, such as from 5° to 25° and including from 10° to 20° with respect to the incident beam of light irradiation. In certain instances, scattered light is detected by a back scatter photodetector positioned to detect scattered light that is propagated at an angle of 30° with respect to the incident beam of light irradiation.

Methods of the present disclosure include detecting scattered light with one or more photodetectors. In some embodiments, scattered light is detected with 2 or more side scatter photodetectors, such as 3 or more side scatter photodetectors, such as 4 or more side scatter photodetectors, such as 5 or more side scatter photodetectors, such as 6 or more side scatter photodetectors, such as 7 or more side scatter photodetectors, such as 8 or more side scatter photodetectors, such as 9 or more side scatter photodetectors and including 10 or more side scatter photodetectors. In other embodiments, scattered light is detected with a side scatter photodetector and a forward scatter photodetector, such as 2 or more side scatter photodetectors and a forward scatter photodetector, such as 3 or more side scatter photodetectors and a forward scatter photodetector, such as 4 or more side scatter photodetectors and a forward scatter photodetector, such as 5 or more side scatter photodetectors and a forward scatter photodetector, such as 6 or more side scatter photodetectors and a forward scatter photodetector, such as 7 or more side scatter photodetectors and a forward scatter photodetector, such as 8 or more side scatter photodetectors and a forward scatter photodetector, such as 9 or more side scatter photodetectors and a forward scatter photodetector and including 10 or more side scatter photodetectors and a forward scatter photodetector. In yet other embodiments, scattered light is detected with a side scatter photodetector and a back scatter photodetector, such as 2 or more side scatter photodetectors and a back scatter photodetector, such as 3 or more side scatter photodetectors and a back scatter photodetector, such as 4 or more side scatter photodetectors and a back scatter photodetector, such as 5 or more side scatter photodetectors and a back scatter photodetector, such as 6 or more side scatter photodetectors and a back scatter photodetector, such as 7 or more side scatter photodetectors and a back scatter photodetector, such as 8 or more side scatter photodetectors and a back scatter photodetector, such as 9 or more side scatter photodetectors and a back scatter photodetector and including 10 or more side scatter photodetectors and a back scatter photodetector. In still other embodiments, scattered light is detected with a side scatter photodetector, a forward scatter photodetector and a back scatter photodetector, such as 2 or more side scatter photodetectors, a forward scatter photodetector and a back scatter photodetector, such as 3 or more side scatter photodetectors, a forward scatter photodetector and a back scatter photodetector, such as 4 or more side scatter photodetectors, a forward scatter photodetector and a back scatter photodetector, such as 5 or more side scatter photodetectors, a forward scatter photodetector and a back scatter photodetector, such as 6 or more side scatter photodetectors, a forward scatter photodetector and a back scatter photodetector, such as 7 or more side scatter photodetectors, a forward scatter photodetector and a back scatter photodetector, such as 8 or more side scatter photodetectors, a forward scatter photodetector and a back scatter photodetector, such as 9 or more side scatter photodetectors, a forward scatter photodetector and a back scatter photodetector and including 10 or more side scatter photodetectors, a forward scatter photodetector and a back scatter photodetector.

In certain embodiments, the scattered light is detected by a light detection system that includes a first side scatter photodetector positioned at a 90° angle with respect to the incident beam of light irradiation and a second side scatter photodetector positioned at an angle that is less than 90° with respect to the incident beam of light irradiation. In some instances, the first side scatter photodetector is configured to detect light that is scattered at an angle of from 30° to 150° with respect to the incident beam of light irradiation, such as from 60° to 120° and including light that is scattered at an angle of 90° with respect to the incident beam of light irradiation and the second side scatter photodetector is configured to detect light that is scattered at an angle of from 5 to 30 with respect to the incident beam of light irradiation, such as 10 to 30° with respect to the incident beam of light irradiation. In certain embodiments, the second side scatter photodetector is configured to detect both side scattered light and back scattered light. In these embodiments, the back scattered light may be propagated to the detector from the flow stream with a mirror, such as with a mirror having a hole (e.g., to pass irradiating light from the light source).

In some embodiments, scattered light from the flow stream is conveyed to the scatter photodetectors through one or more optical adjustment components. The term "optical adjustment" is used herein in its convention sense to refer to an optical component that changes or adjusts light that is propagated to the light scatter photodetectors. For example, the optical adjustment may be to change the profile of the light beam, the focus of the light beam, the direction of beam propagation or to collimate the light beam. In certain embodiments, scattered light is conveyed through one or more of a dichroic mirror and a bandpass filter to the scatter photodetectors. In some instances, scattered light from particles in the flow stream are conveyed through a dichroic mirror and a bandpass filter to each scatter photodetector.

The amount of light propagated to the light scatter photodetectors through the optical adjustment component may also vary, where in some embodiments, 50% or more of the collected light is conveyed to the light scatter photodetectors, such as 55% or more, such as 60% or more, such as 65% or more, such as 75% or more, such as 80% or more, such as 90% or more and including 95% or more of the light from the flow stream is conveyed to the light scatter photodetectors through the optical adjustment component. For example, the amount of light propagated to the light scatter photodetectors through the optical adjustment component may range from 25% to 99%, such as from 30% to 95%, such as from 35% to 90%, such as from 40% to 85%, such as from 45% to 80% and including from 50% to 75%.

The light scatter photodetector may be any suitable photosensor, such as active-pixel sensors (APSs), avalanche photodiode, image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors. In embodiments, the light scatter photodetector may include 1 or more photosensor, such as 2 or more, such as 3 or more, such as 5 or more, such as 10 or more and including 25 or more photosensors. In some instances, the light scatter photodetector is a photodetector array. The term "photodetector array" is used in its conventional sense to refer to an arrangement or series of two or more photodetectors that are configured to detect light. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. In certain embodiments, photodetector arrays include 5 photodetectors. The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in a light scatter photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°.

The light scatter photodetector of the present disclosure are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, the subject photodetectors are configured to measure collected light over a range of wavelengths (e.g., 200 nm-1000 nm). In certain embodiments, detectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. In embodiments, the light detection system is configured to measure light continuously or in discrete intervals. In some instances, detectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, light scattered by particles in the flow stream are conveyed through one or more output polarizers to the photodetectors. In certain embodiments, passing the scattered light through the output polarizer generates polarized scattered light oscillating at the reference frequency. The output polarizer may be any convenient optical polarizer, including but not limited to, a linear polarizer, an absorptive polarizer, a beam-splitting polarizer, a birefringent polarizer, a thin film polarizer, a wire grid polarizer, a circular polarizer and an optical polarizer configured for polarization by Fresnel reflection. In certain embodiments, the output polarizer includes a quarter waveplate. The scattered light from the flow stream may be conveyed through one or more output polarizers to the photodetector, such as 2 or more, such as 3 or more, such as 4 or more and including 5 or more output polarizers. The output polarizer may be positioned at a distance from the flow stream that varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle of the polarizer relative to the flow stream may also vary, ranging from 10° to 90° with respect to the planar surface of the polarizer, such as from 15° to 85°, such as from 20° to 80°, such as from 25° to 75° and including from 30° to 60°, for example at a 90° angle.

In certain embodiments, scattered light is detected in two or more different detector channels, such as where side scattered light is detected in two or more different detector channels. In some instances, where the scattered light is detected in two or more different detector channels, each detector channel is optically coupled to a polarizer. For example, methods may include detecting side scattered light in two different scatter detector channels where light is detected with a first side scatter detector conveyed through a first polarizer having a first polarization and with a second side scatter detector conveyed through a second polarizer having a second polarization. In some instances, the first polarization and the second polarization differ from each other by 5° or more, such as by 10° or more, such as by 15° or more, such as by 20° or more, such as by 25° or more, such as by 30° or more, such as by 45° or more, such as by 60° or more, such as by 75° or more and including where the first polarizer has a polarization that is perpendicular to the polarization of the second polarizer (i.e., the polarization of the first polarizer differs from the polarization of the second polarizer by 90°).

In embodiments, methods include generating a frequency-encoded data signal from the scattered light with each of the photodetectors. In some embodiments, the frequency-encoded data signal is generated by detecting the amplitude of scattered light that is oscillating at the reference frequency. In some instances, methods include detecting the amplitude of data signals from the photodetector having an oscillating frequency of from 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, generating a frequency-encoded data signal is sufficient to reduce or eliminate the contribution of low frequency noise components from the photodetector data signal, such as where detecting the amplitude of scattered light that is oscillating at the reference frequency reduces the contribution of low frequency noise components from the photodetector data signal by 5% or more, such as by 10% or more, such as by 15% or more, such as by 20% or more, such as by 25% or more, such as by 30% or more, such as by 50% or more, such as by 60% or more, such as by 75% or more, such as by 90% or more, such as by 95% or more, such as by 97% or more, such as by 99% or more and including where detecting the amplitude of scattered light that is oscillating at the reference frequency is sufficient to eliminate any contribution by low frequency noise to the photodetector data signal. In other embodiments, detecting the amplitude of scattered light that is oscillating at the reference frequency reduces the contribution of photodetector drift to the photodetector data signal, such as by 5% or more, such as by 10% or more, such as by 15% or more, such as by 20% or more, such as by 25% or more, such as by 30% or more, such as by 50% or more, such as by 60% or more, such as by 75% or more, such as by 90% or more, such as by 95% or more, such as by 97% or more, such as by 99% or more and including where detecting the amplitude of scattered light that is oscillating at the reference frequency is sufficient to eliminate any contribution by photodetector drift to the photodetector data signal.

The generated frequency-encoded data signal is synchronized with the reference frequency signal. To term "synchronized" is used herein in its conventional sense to refer to matching the modulation frequency of the reference signal (e.g., generated by the controller coupled to the optical modulator) with oscillating frequency of data signals generated by the photodetector in response to detected scattered light. In some embodiments, the frequency-encoded data signals are synchronized with the reference data signal when the oscillating frequency of the frequency-encoded data signals differs from the frequency of the reference data signal by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less and including where the oscillating frequency of the frequency-encoded data signals differs from the frequency of the reference data signal by 0.00001% or less. In certain embodiments, the frequency-encoded data signals are synchronized with the reference data signal when the oscillating frequency of the frequency-encoded data signals are identically matched with the frequency of the reference data signal.

In some embodiments, the frequency-encoded data signals are synchronized with the reference data signal with a lock-in amplifier. In some instances, the frequency-encoded data signals are communicated to a lock-in amplifier and synchronized with a reference waveform. In some embodiments, to synchronize the frequency-encoded data signals with the reference frequency waveform, each of the frequency-encoded data signals are multiplied with the reference frequency waveform. In certain instances, unmodulated background signal is converted by lock-in amplification into a bipolar square wave. In some embodiments, lock-in amplification is performed on an integrated circuit device. In some instances, lock-in amplification is performed on a field programmable gate array (FPGA). In other instances, lock-in amplification is performed on an application specific integrated circuit (ASIC). In still other embodiments, lock-in amplification is performed on a complex programmable logic device (CPLD). In certain embodiments, the frequency-encoded data signal is digitally synchronized with the reference frequency. For example, the frequency-encoded data signal may be processed on a processor having memory operably coupled to the processor where the memory has instructions stored thereon, which when executed by the processor, cause the processor to receive a frequency-encoded data signal from the photodetector and to synchronize with the reference signal with the frequency-encoded data signal. In certain instances, the reference frequency signal is stored on the memory. In other instances, the reference frequency signal is communicated to the processor from a controller in communication with the optical modulator component.

In some embodiments, methods include generating a data signal profile from the synchronized frequency-encoded data signal. In some instances, to generate a data signal profile, a low-pass filter is applied to the synchronized frequency-encoded data signal. In some embodiments, the low-pass filter is applied to the synchronized frequency-encoded data signal with the lock-in amplifier. In other embodiments, the low-pass filter is digitally applied to the synchronized frequency-encoded data signal. In some instances, applying the low-pass filter to the synchronized frequency-encoded data signal generates a Gaussian signal profile. In other instances, applying the low-pass filter to the synchronized frequency-encoded data signal generates a super-Gaussian signal profile.

FIG. 1A depicts a particle analyzer according to certain embodiments. Particle analyzer 100 includes a laser 101 configured to generate a beam of laser light that is conveyed through input polarizer 102 to optical modulator 103 (e.g., electro-optic modulator) which receives a reference frequency signal from controller 104. The outputted frequency-modulated beam of light irradiates particles in flow stream 105 emanating from flow cell 106. Irradiation of the particles in flow stream 105 generates fluorescence that is detected by fluorescence detectors 107a, 107b, 107c and generates scattered light that is detected by side scatter photodetector 108 and forward scatter detector 109. Scattered light from the particles is conveyed through output polarizer 108a to side scatter photodetector 108 and through output polarizer 109a to forward scatter photodetector 109. Scatter photodetectors 108 and 109 are in communication with lock-in amplifier 110 to synchronize the generated frequency-encoded data signal with reference frequency from controller 104.

Figure 1B:
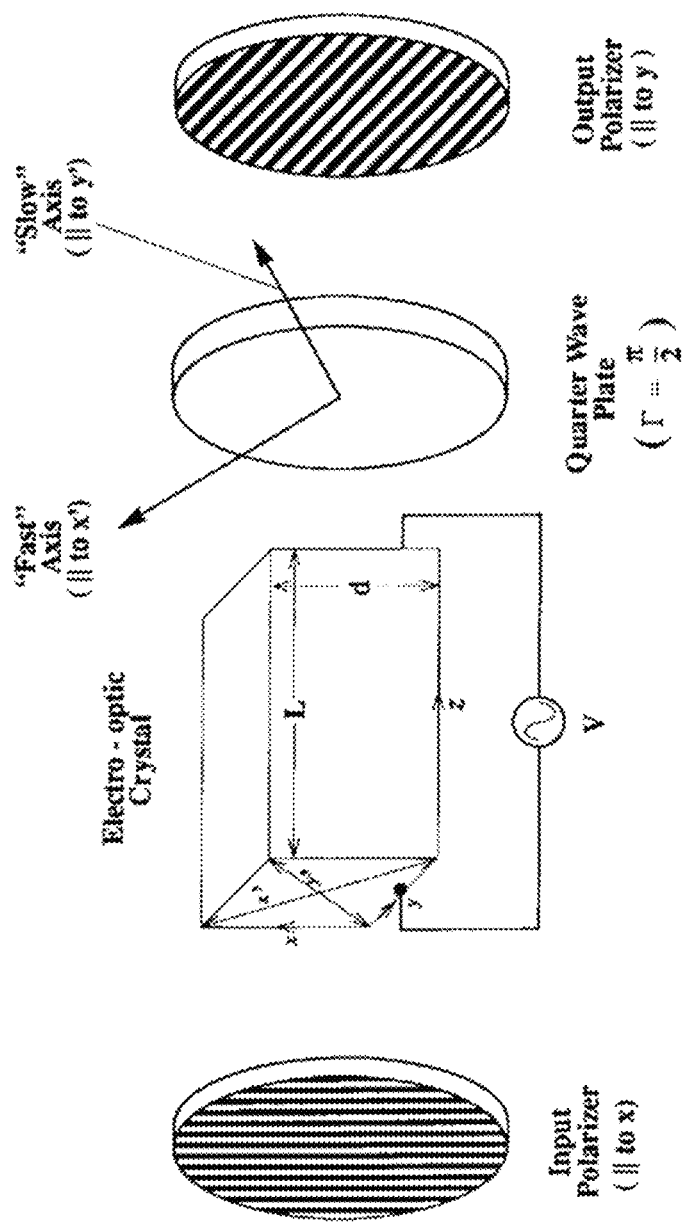
FIG. 1B depicts an optical modulation component of a light source according to certain embodiments.

FIG. 1B depicts an optical modulation component of a light source according to certain embodiments. The optical modulation component includes an input polarizer for generating polarized laser light that is conveyed to a light receiving end of an electro-optic crystal for imposing a frequency modulation to the polarized beam of laser light. Frequency-modulated laser light emanating from the electro-optic crystal is passed through a quarter wave plate and an output polarizer to further impart polarization to the beam of laser light.

Figure 2A:
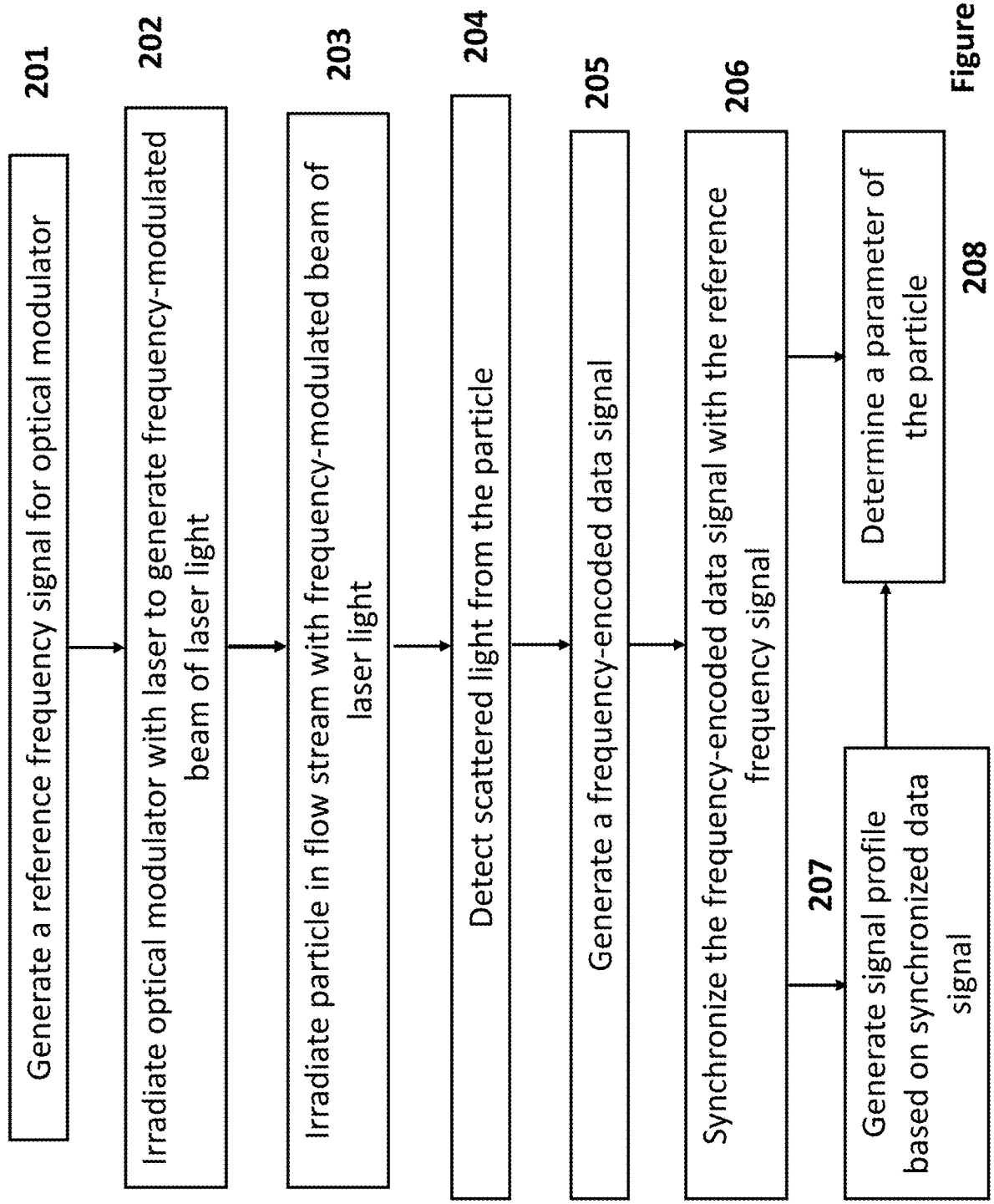
FIG. 2A depicts a flow chart for determining a parameter of a particle in a flow stream according to certain embodiments.

FIG. 2A depicts a flow chart for determining a parameter of a particle in a flow stream according to certain embodiments. At step 201, a reference frequency signal is generated for an optical modulator, which imposes the frequency modulation onto the laser beam when irradiated with a laser at step 202, generating a frequency-modulated beam of laser light having an oscillating frequency at the reference frequency. Particles in a flow stream are irradiated with the frequency-modulated beam of laser light at step 203. At step 204, scattered light from the particle is detected. In some embodiments, the scattered light is detected through an output polarizer. In certain instances, the scattered light is detected in two different detector channels, where the detector channels have output polarizers with perpendicular polarization. A frequency-encoded data signal is generated at step 205 where the data signal has an oscillating frequency at the reference frequency. The generated data signal is synchronized with the reference frequency at step 206. The frequency-encoded data signal can be synchronized digitally with the system processor or with a lock-in amplifier. In certain embodiments, lock-in amplification is performed on an FPGA having programming for receiving the reference frequency signal and synchronizing the frequency-encoded data signal with the reference frequency signal. In some embodiments, one or more parameters (e.g., particle size, morphology) are determined based on the synchronized frequency-encoded data signal at step 208. In other embodiments, a data profile is generated from the synchronized frequency-encoded data signal at step 207. The one or more parameters can also be determined based on the generated data profile.

Figure 2B:
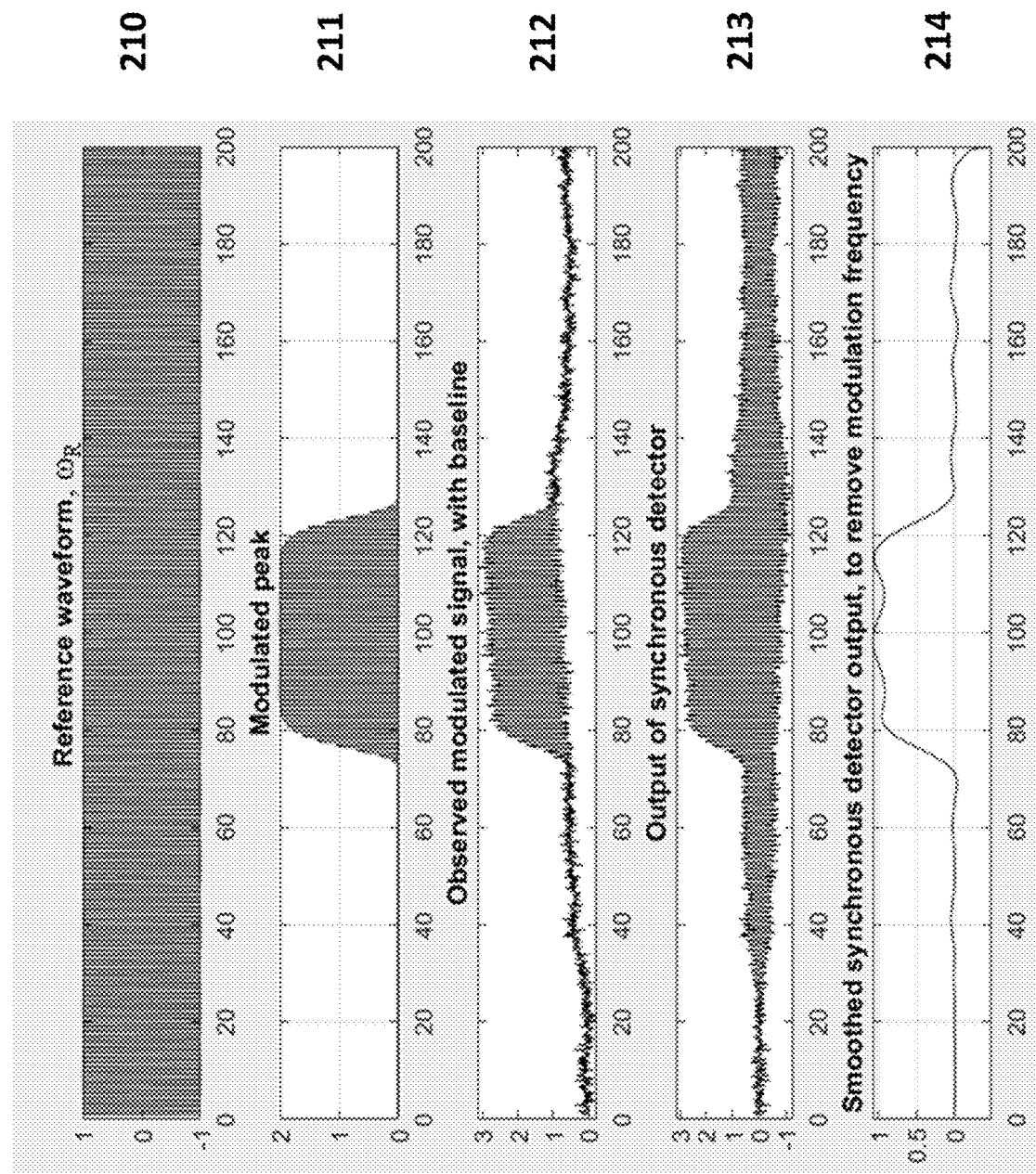
FIG. 2B depicts the generation and processing of a data signal profile from the irradiation of a particle in a flow stream according to certain embodiments.

FIG. 2B depicts the generation and processing of a data signal profile from the irradiation of a particle in a flow stream according to certain embodiments. A reference waveform having oscillating frequency $\omega_R$ is generated at panel 210. Scattered light from an irradiated particle in a flow stream is detected and a modulated peak data signal is generated at panel 211. The modulated peak exhibits oscillation at the reference frequency $\omega_R$. After polarization modulation, background signal is introduced into the total signal depicted in panel 212. This signal in panel 212 is modeled as a random walk, which exhibits distortion in the data signal. At panel 213, the data signal generated by the scatter photodetector is synchronized with the reference waveform by multiplying with a lock-in amplifier the frequency-encoded data signal with the reference waveform. The unmodulated background signal is converted into a bipolar square wave. A low pass filter is applied during lock-in amplification at panel 214 to the synchronized data signal to generate a recovered data signal profile.

Figure 3A:
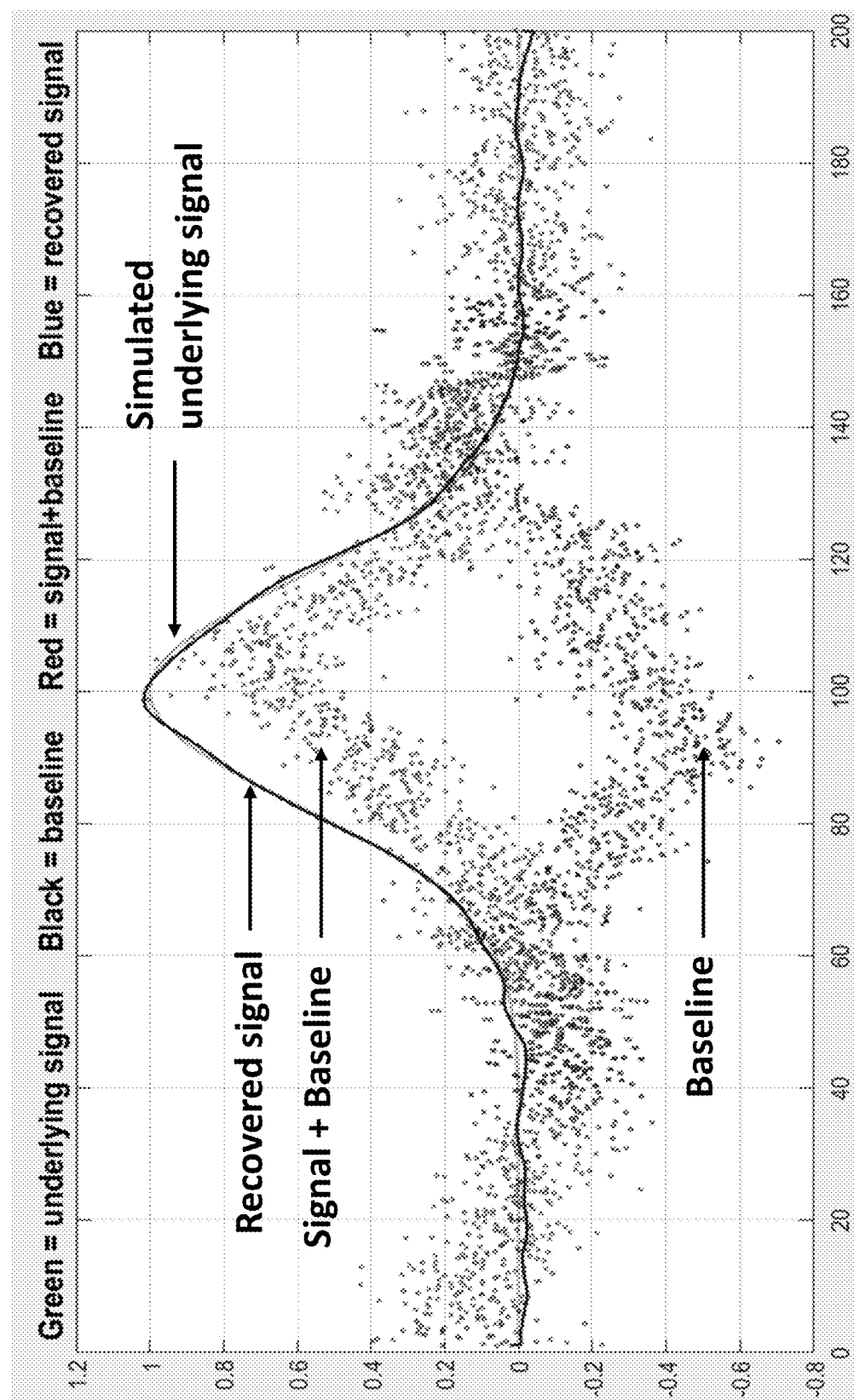
FIG. 3A depicts the detection and recovery of a Gaussian data signal profile according to certain embodiments.
Figure 3B:
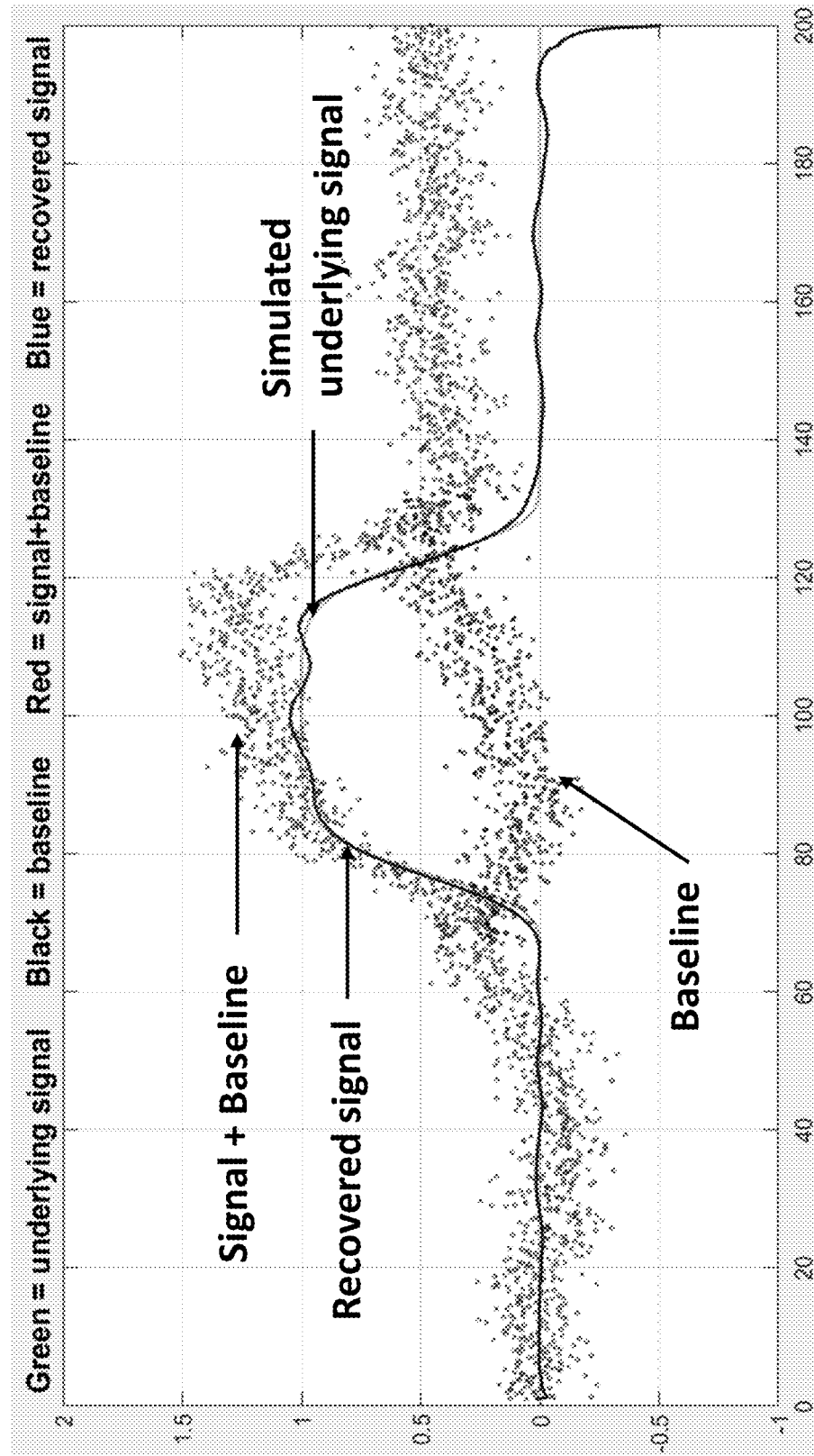
FIG. 3B depicts the detection and recovery of a super-Gaussian data signal profile according to certain embodiments.

FIGS. 3A and 3B depict the detection and recovery of a Gaussian (FIG. 3A) and super Gaussian data signal profile (FIG. 3B) according to certain embodiments. Detection of the irradiated particles generates data points that results from data signal and background. The underlying baseline background signal is also depicted. A frequency-encoded data signal recovered by synchronizing the detected signal (and baseline) with the reference frequency waveform generates a recovered signal that eliminates any interference by background signal, such as from low frequency noise components or detector drift from the detection system. As shown in FIGS. 3A and 3B, the recovered data signal profiles correspond closely to the simulated underlying data signal.

In certain embodiments, methods further include determining one or more parameters of particles in the flow stream. In some instances, the sample in the flow stream includes cells and methods include detecting the cells in the sample. In some embodiments, detecting the cells includes identifying the types of cells in the sample. In other embodiments, methods include characterizing the cells of the sample. In yet other embodiments, methods include differentiating between types of cells in the sample. In certain embodiments, methods include identifying and differentiating between types of cells based on synchronized frequency-encoded data signals or from the generated data signal profiles. In some instances, methods include generating an image of the flow stream and identifying the types of cells in the sample based on synchronized frequency-encoded data signals or from the generated data signal profiles.

In some embodiments, methods include sorting one or more particles from the sample in the flow stream. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, the particle classification may include sorting gates for sorting 2 or more components of the sample, such as 3 or more components, such as 4 or more components, such as 5 or more components, such as 10 or more components, such as 15 or more components and including sorting 25 or more components of the sample. In sorting particles, methods include data acquisition, analysis and recording, such as with a computer, where multiple data channels record data from each detector used. In these embodiments, analysis may include spectrally resolving light (e.g., by calculating the spectral unmixing matrix). This analysis may be conveyed to a sorting system which is configured to generate a set of digitized parameters based on the particle classification.

In some embodiments, methods for sorting components of sample include sorting particles (e.g., cells in a biological sample), such as described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804, the disclosures of which are herein incorporated by reference. In some embodiments, methods include sorting components of the sample with a particle sorting module, such as those described in U.S. Pat. Nos. 9,551,643 and 10,324,019, U.S. Patent Publication No. 2017/0299493 and International Patent Publication No. WO/2017/040151, the disclosure of which is incorporated herein by reference. In certain embodiments, cells of the sample are sorted using a sort decision module having a plurality of sort decision units, such as those described in U.S. patent application Ser. No. 16/725,756, filed on Dec. 23, 2019, the disclosure of which is incorporated herein by reference.

Systems for Determining a Parameter of a Particle in an Irradiated Sample Ina Flow Stream Aspects of the present disclosure include systems for determining a parameter of a particle in an irradiated sample in a flow stream. Systems according to certain embodiments include a light source having a laser and an optical modulator component configured to generate a frequency-modulated beam of laser light at a reference frequency, a light detection system having a light scatter photodetector and a processor with memory operably coupled to the processor where the memory includes instructions stored thereon, which when executed by the processor cause the processor to generate a frequency-encoded data signal from the detected scattered light, synchronize the frequency-encoded data signal with the reference frequency and determine one or more parameters of the particle based on the synchronized frequency-encoded data signal.

In embodiments, systems include a light source configured to generate a modulated beam of laser light that is modulated at a reference frequency. The light source includes one or more lasers (as described in greater detail below) and an optical modulator component that is configured to receive light from the lasers and to generate a modulated beam of laser light. In embodiments, one or more properties of the laser light may be changed by passing the laser light through the optical modulator component, including the phase, frequency, amplitude or polarization of the laser beam. In certain embodiments, the optical modulator is configured to generate a frequency-modulated beam of light.

In some embodiments, the modulator is an electro-optic modulator. In some instances, the electro-optic modulator includes a component (e.g., a nonlinear optical material such as a non-linear organic polymer or a crystalline lithium niobate) that changes a refractive index in response to application of a direct current and irradiating the electro-optic modulator with the laser is sufficient to output a frequency-modulated beam of light from the laser. In other instances, the electro-optic modulator includes a component that changes a refractive index in response to application of a low-frequency electric field and irradiating the electro-optic modulator with the laser is sufficient to output a frequency-modulated beam of light from the laser. In certain embodiments, the optical modulator is an acousto-optic modulator such as a piezo optic modulator with the laser.

In some embodiments, the optical modulator is configured to modulate the frequency of the beam of laser light. In some instances, the optical modulator is configured to modulate the frequency of the laser beam at a reference frequency, such as at an oscillating frequency that ranges from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, systems include a controller for applying an electric current or electric field to the optical modulator. In certain embodiments, the controller is configured with an electric pulse generator. In other embodiments, the controller is configured to apply a radiofrequency drive signal, such as where the controller includes a direct digital synthesizer (DDS) or an arbitrary waveform generator (AWS). In some embodiments, the controller is configured to generate a reference frequency signal waveform. The generated reference frequency signal waveform according to certain embodiments has an oscillating frequency that ranges, such as from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, the optical modulator is in optical communication with an input polarizer. In these embodiments, the input polarizer is positioned between the laser and the optical modulator such that laser light is conveyed through the input polarizer to the light receiving end of the optical modulator. The input polarizer may be any convenient optical polarizer, including but not limited to, a linear polarizer, an absorptive polarizer, a beam-splitting polarizer, a birefringent polarizer, a thin film polarizer, a wire grid polarizer, a circular polarizer and an optical polarizer configured for polarization by Fresnel reflection. The light source may include one or more input polarizers, such as 2 or more, such as 3 or more, such as 4 or more and including 5 or more input polarizers. The input polarizer may be positioned the 0.01 mm or more from the laser, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, input polarizer may be positioned at an angle with respect to the laser that varies, ranging from 10° to 90° with respect to the planar surface of the polarizer, such as from 15° to 85°, such as from 20° to 80°, such as from 25° to 75° and including from 30° to 60°, for example at a 90° angle.

In embodiments, the light source of the subject systems includes one or more lasers, such as 2 or more lasers, such as 3 or more lasers, such as 4 or more lasers, such as 8 or more lasers, such as 12 or more lasers, such as 16 or more lasers, such as 24 or more laser, such as 36 or more lasers, such as 48 or more lasers and including 60 or more lasers. Lasers of interest may include pulsed lasers or continuous wave lasers. The type and number of lasers in the subject light sources may vary and may include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the light source includes a dye laser, such as a stilbene, coumarin or rhodamine laser. In yet other instances, the light source includes a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the light source includes a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, the light source includes a semiconductor diode laser, optically pumped semiconductor laser (OPSL), or a frequency doubled- or frequency tripled implementation of any of the above mentioned lasers.

Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. Systems may include any combination of types of lasers. For example, in some embodiments, the methods include irradiating the optical modulator with an array of lasers, such as an array having one or more gas lasers, one or more dye lasers and one or more solid-state lasers.

Where more than laser is employed, the light source may be configured to irradiate the optical modulator with the lasers simultaneously or sequentially, or a combination thereof. For example, the lasers may be configured to irradiate the optical modulator simultaneously. In other embodiments, the lasers are configured to irradiate the optical modulator sequentially. Where the laser is configured to irradiate the optical modulator sequentially, the time each laser may be configured to irradiate the optical modulator independently for 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, the laser may be configured to irradiate an electro optic modulator device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments, each laser may be configured to irradiate the optical modulator for a duration that is the same or different from each other.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the optical modulator device is sequentially irradiated by more than two (i.e., 3 or more) lasers, the delay between irradiation by each laser may be the same or different.

The lasers may be configured for irradiating the optical modulator continuously or in discrete intervals. In some instances, each laser may be configured to irradiate the optical modulator continuously. In other instances, each laser may be configured to irradiate the optical modulator in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

The laser may be positioned in the subject light source a distance that varies from the optical modulator such as a distance of 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the laser may be positioned at an angle to the optical modulator, such as at an angle ranging from 10° to 90°, such as from 15° to 85°, such as from 20° to 80°, such as from 25° to 75° and including from 30° to 60°, for example at a 90° angle.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Systems of interest include one or more photodetectors configured to detect scattered light from a sample in a flow stream. In embodiments, the scatter photodetectors may be side scatter photodetectors, forward scatter photodetectors, back scatter photodetectors and combinations thereof. In some embodiments, the scattered light detected by the photodetectors is not luminescence from a component of the particle (e.g., a fluorophore). In embodiments, the scattered light detected by the photodetectors is not fluorescence or phosphorescence. In certain embodiments, the photodetectors are configured to detect Mie scattering. In other embodiments, the photodetectors are configured to detect Rayleigh scattering. In still other embodiments, the photodetectors are configured to detect Mie scattering and Rayleigh scattering.

The photodetectors may be positioned relative to the flow stream at an angle of 1° or more, such as 10° or more, such as 15° or more, such as 20° or more, such as 25° or more, such as 30° or more, such as 45° or more, such as 60° or more, such as 75° or more, such as 90° or more, such as 135° or more, such as 150° or more and including where the scattered light detector is configured to detect light from particles in the sample at an angle that is 180° or more with respect to the incident beam of light irradiation. In certain instances, the light scatter photodetectors include a side scatter photodetector, such as where the photodetector is positioned to detect scattered light that is propagated from 30° to 120° with respect to the incident beam of light irradiation, such as from 45° to 105° and including from 60° to 90°. In certain instances, the light scatter detector is a side scatter photodetector positioned at an angle of 90° with respect to the incident beam of light irradiation. In other instances, the light scatter detector is a forward scatter detector, such as where the detector is positioned to detect scattered light that is propagated from 120° to 240° with respect to the incident beam of light irradiation, such as from 100° to 220°, such as from 120° to 200° and including from 140° to 180° with respect to the incident beam of light irradiation. In certain instances, the light scatter detector is a front scatter photodetector positioned to detect scattered light that is propagated at an angle of 180° with respect to the incident beam of light irradiation. In yet other instances, the light scatter detector is a back scatter photodetector positioned to detect scattered light that is propagated from 1° to 30° with respect to the incident beam of light irradiation, such as from 5° to 25° and including from 10° to 20° with respect to the incident beam of light irradiation. In certain instances, scattered light is detected by a back scatter photodetector positioned to detect scattered light that is propagated at an angle of 30° with respect to the incident beam of light irradiation.

Systems of the present disclosure include one or more photodetectors. In some embodiments, light detection systems include 2 or more side scatter photodetectors, such as 3 or more side scatter photodetectors, such as 4 or more side scatter photodetectors, such as 5 or more side scatter photodetectors, such as 6 or more side scatter photodetectors, such as 7 or more side scatter photodetectors, such as 8 or more side scatter photodetectors, such as 9 or more side scatter photodetectors and including 10 or more side scatter photodetectors. In other embodiments, light detection systems include a side scatter photodetector and a forward scatter photodetector, such as 2 or more side scatter photodetectors and a forward scatter photodetector, such as 3 or more side scatter photodetectors and a forward scatter photodetector, such as 4 or more side scatter photodetectors and a forward scatter photodetector, such as 5 or more side scatter photodetectors and a forward scatter photodetector, such as 6 or more side scatter photodetectors and a forward scatter photodetector, such as 7 or more side scatter photodetectors and a forward scatter photodetector, such as 8 or more side scatter photodetectors and a forward scatter photodetector, such as 9 or more side scatter photodetectors and a forward scatter photodetector and including 10 or more side scatter photodetectors and a forward scatter photodetector. In yet other embodiments, light detection systems includes a side scatter photodetector and a back scatter photodetector, such as 2 or more side scatter photodetectors and a back scatter photodetector, such as 3 or more side scatter photodetectors and a back scatter photodetector, such as 4 or more side scatter photodetectors and a back scatter photodetector, such as 5 or more side scatter photodetectors and a back scatter photodetector, such as 6 or more side scatter photodetectors and a back scatter photodetector, such as 7 or more side scatter photodetectors and a back scatter photodetector, such as 8 or more side scatter photodetectors and a back scatter photodetector, such as 9 or more side scatter photodetectors and a back scatter photodetector and including 10 or more side scatter photodetectors and a back scatter photodetector. In still other embodiments, light detection systems include a side scatter photodetector, a forward scatter photodetector and a back scatter photodetector, such as 2 or more side scatter photodetectors, a forward scatter photodetector and a back scatter photodetector, such as 3 or more side scatter photodetectors, a forward scatter photodetector and a back scatter photodetector, such as 4 or more side scatter photodetectors, a forward scatter photodetector and a back scatter photodetector, such as 5 or more side scatter photodetectors, a forward scatter photodetector and a back scatter photodetector, such as 6 or more side scatter photodetectors, a forward scatter photodetector and a back scatter photodetector, such as 7 or more side scatter photodetectors, a forward scatter photodetector and a back scatter photodetector, such as 8 or more side scatter photodetectors, a forward scatter photodetector and a back scatter photodetector, such as 9 or more side scatter photodetectors, a forward scatter photodetector and a back scatter photodetector and including 10 or more side scatter photodetectors, a forward scatter photodetector and a back scatter photodetector.

In certain embodiments, the light detection system includes a first side scatter photodetector positioned at a 90° angle with respect to the incident beam of light irradiation and a second side scatter photodetector positioned at an angle that is less than 90° with respect to the incident beam of light irradiation. In some instances, the first side scatter photodetector is configured to detect light that is scattered at an angle of from 30° to 150° with respect to the incident beam of light irradiation, such as from 60° to 120° and including light that is scattered at an angle of 90° with respect to the incident beam of light irradiation and the second side scatter photodetector is configured to detect light that is scattered at an angle of from 5 to 30 with respect to the incident beam of light irradiation, such as 10 to 30° with respect to the incident beam of light irradiation. In certain embodiments, the second side scatter photodetector is configured to detect both side scattered light and back scattered light. In these embodiments, the back scattered light may be propagated to the detector from the flow stream with a mirror, such as with a mirror having a hole (e.g., to pass irradiating light from the light source).

In some embodiments, light detection systems include one or more optical adjustment components configured to convey scattered light from the flow stream to one or more of the photodetectors. For example, the optical adjustment may be to change the profile of the light beam, the focus of the light beam, the direction of beam propagation or to collimate the light beam. In certain embodiments, light detection systems include one or more mirrors (e.g., dichroic mirror) positioned to convey scattered light from the flow stream to a photodetector. In other embodiments, light detection systems include one or more beam splitters positioned to convey scattered light from the flow stream to a photodetector. In still other embodiments, light detection systems include one or more lenses positioned to convey scattered light from the flow stream to a photodetector. In other embodiments, light from the flow stream is conveyed directly to a photodetector without passing through an optical adjustment component.

The light scatter photodetector may be any suitable photosensor, such as active-pixel sensors (APSs), avalanche photodiode, image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors. In embodiments, the light scatter photodetector may include 1 or more photosensor, such as 2 or more, such as 3 or more, such as 5 or more, such as 10 or more and including 25 or more photosensors. In some instances, the light scatter photodetector is a photodetector array. The term "photodetector array" is used in its conventional sense to refer to an arrangement or series of two or more photodetectors that are configured to detect light. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. In certain embodiments, photodetector arrays include 5 photodetectors. The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in a light scatter photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°.

The light scatter photodetector of the present disclosure are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, the subject photodetectors are configured to measure collected light over a range of wavelengths (e.g., 200 nm-1000 nm). In certain embodiments, detectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. In embodiments, the light detection system is configured to measure light continuously or in discrete intervals. In some instances, detectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, systems include one or more output polarizers. In some instances, the output polarizers are configured to generate polarized scattered light that is oscillating at the reference frequency, as described above. The output polarizer may be any convenient optical polarizer, including but not limited to, a linear polarizer, an absorptive polarizer, a beam-splitting polarizer, a birefringent polarizer, a thin film polarizer, a wire grid polarizer, a circular polarizer and an optical polarizer configured for polarization by Fresnel reflection. In certain embodiments, the output polarizer includes a quarter waveplate. Light detection systems may include one or more output polarizers to the photodetector, such as 2 or more, such as 3 or more, such as 4 or more and including 5 or more output polarizers. The output polarizer may be positioned at a distance from the flow stream that varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle of the polarizer relative to the flow stream may also vary, ranging from 10° to 90° with respect to the planar surface of the polarizer, such as from 15° to 85°, such as from 20° to 80°, such as from 25° to 75° and including from 30° to 60°, for example at a 90° angle.

In certain embodiments, light detection systems include two or more scatter photodetectors where scattered light is detected in two or more different detector channels, such as where side scattered light is detected in two or more different detector channels. In some instances, each detector channel is optically coupled to a polarizer. For example, systems may include two different scatter detector channels with a first side scatter detector optically coupled to a first polarizer having a first polarization and with a second side scatter detector optically coupled to a second polarizer having a second polarization. In some instances, the polarization of the first polarizer and the polarization of the second polarizer differ from each other by 5° or more, such as by 10° or more, such as by 15° or more, such as by 20° or more, such as by 25° or more, such as by 30° or more, such as by 45° or more, such as by 60° or more, such as by 75° or more. In certain embodiments, the polarization of the first polarizer is perpendicular to the polarization of the second polarizer (i.e., the polarization of the first polarizer differs from the polarization of the second polarizer by 90°).

In embodiments, systems include a processor having memory operably coupled to the processor where the memory includes instructions stored thereon, which when executed by the processor, cause the processor to generate a frequency-encoded data signal from the detected scattered light. In some embodiments, the memory includes instructions for detecting the amplitude of scattered light that is oscillating at the reference frequency. In certain embodiments, the memory include instructions for detecting the amplitude of data signals from the photodetector having an oscillating frequency of from 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, the processor includes having instructions stored thereon, which when executed by the processor, cause the processor to synchronize the generated frequency-encoded data signal with the reference frequency signal. In some embodiments, the memory includes instructions for synchronizing the frequency-encoded data signals with the reference data signal when the oscillating frequency of the frequency-encoded data signals differs from the frequency of the reference data signal by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less and including where the oscillating frequency of the frequency-encoded data signals differs from the frequency of the reference data signal by 0.00001% or less. In certain embodiments, the memory includes instructions for synchronizing the frequency-encoded data signals with the reference data signal when the oscillating frequency of the frequency-encoded data signals are identically matched with the frequency of the reference data signal.

In certain embodiments, systems include a lock-in amplifier for synchronizing the reference data signal with the frequency-encoded data signals. In some instances, the lock-in amplifier is configured to synchronize the frequency-encoded data signals with a reference frequency waveform. In certain instances, the lock-in amplifier is configured to multiply the frequency-encoded data signals with the reference frequency waveform. In certain embodiments, systems include an integrated circuit device that is configured to perform the lock-in amplification. In some embodiments, the integrated circuit is a field programmable gate array (FPGA). In other instances, the integrated circuit is an application specific integrated circuit (ASIC). In still other embodiments, the integrated circuit is a complex programmable logic device (CPLD). In certain embodiments, systems are configured to digitally synchronize the frequency-encoded data signal with the reference frequency. For example, the frequency-encoded data signal may be processed on a processor having memory operably coupled to the processor where the memory has instructions stored thereon, which when executed by the processor, cause the processor to receive a frequency-encoded data signal from the photodetector and to synchronize with the reference signal with the frequency-encoded data signal. In certain instances, the reference frequency signal is stored on the memory. In other instances, the processor of the subject systems is configured to receive the reference frequency signal from a controller that is in communication with the optical modulator component.

In some embodiments, systems include a processor having memory operably coupled to the processor where the memory includes instructions stored thereon, which when executed by the processor, cause the processor to generate a data signal profile from the synchronized frequency-encoded data signal. In some instances, the memory includes instructions for applying a low-pass filter to the synchronized frequency-encoded data signal to generate the data signal profile. In some embodiments, the lock-in amplifier is configured to apply the low-pass filter to the synchronized frequency-encoded data signal. In other embodiments, the memory includes instructions for digitally applying the low-pass filter to the synchronized frequency-encoded data signal. In certain instances, the memory includes instructions for applying the low-pass filter to the synchronized frequency-encoded data signal to generate a Gaussian signal profile. In other instances, the memory includes instructions for applying the low-pass filter to the synchronized frequency-encoded data signal to generate a super-Gaussian signal profile.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be1 μL/min or more, such as 2 μL/min or more, such as 3 μL/min or more, such as 5 μL/min or more, such as 10 μL/imin or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 254/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 μL/min (microliter per minute) or more, such as 2 μL/min or more, such as 3 μL/min or more, such as 5 μL/min or more, such as 10 μL/min or more, such as 25 μL/min or more, such as 50 μL/min or more, such as 75 μL/min or more, such as 100 μL/min or more, such as 250 μL/min or more, such as 500 μL/min or more, such as 750 μL/min or more and including 1000 μL/min or more. For example, the system may include a pump that is configured to flow sample through the flow cell at a rate that ranges from 1 μL/min to 500 μL/min, such as from 1 uL/min to 250 uL/min, such as from 1 uL/min to 100 uL/min, such as from 2 μL/min to 90

µL/min, such as from 3 µL/min to 80 µL/min, such as from 4 µL/min to 70 µL/min, such as from 5 µL/min to 60 µL/min and including rom 10 µL/min to 50 µL/min. In certain embodiments, the flow rate of the flow stream is from 5 µL/min to 6 µL/min.

In certain embodiments, the subject systems are flow cytometric systems employing the above described light detection system for detecting light emitted by a sample in a flow stream. In certain embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSR-Fortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661; 9,983, 132; 10,006,852; 10,078,045; 10,036,699; 10,222,316; 10,288,546; 10,324,019; 10,408,758; 10,451,538; 10,620, 111; and U.S. Patent Publication Nos. 2017/0133857; 2017/ 0328826; 2017/0350803; 2018/0275042; 2019/0376895 and 2019/0376894 the disclosures of which are herein incorporated by reference.

In certain embodiments, the subject systems are configured to sort one or more of the particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, particle sorting systems of interest are configured to sort particles, such as described in U.S. Pat. Nos. 3,960,449; 4,347,935; 4,667,830; 5,245,318; 5,464, 581; 5,483,469; 5,602,039; 5,643,796; 5,700,692; 6,372,506 and 6,809,804, the disclosures of which are herein incorporated by reference. In some embodiments, particle sorting systems are configured to sort particles with an enclosed particle sorting module, such as those described in U.S. Pat. Nos. 9,551,643 and 10,324,019, U.S. Patent Publication No. 2017/0299493 and International Patent Publication No. WO/2017/040151, the disclosures of which are incorporated herein by reference. In certain embodiments, particles (e.g., cells) of the sample are sorted using a sort decision module having a plurality of sort decision units, such as those described in U.S. patent application Ser. No. 16/725,756, filed on Dec. 23, 2019, the disclosure of which is incorporated herein by reference.

Figure 4A:
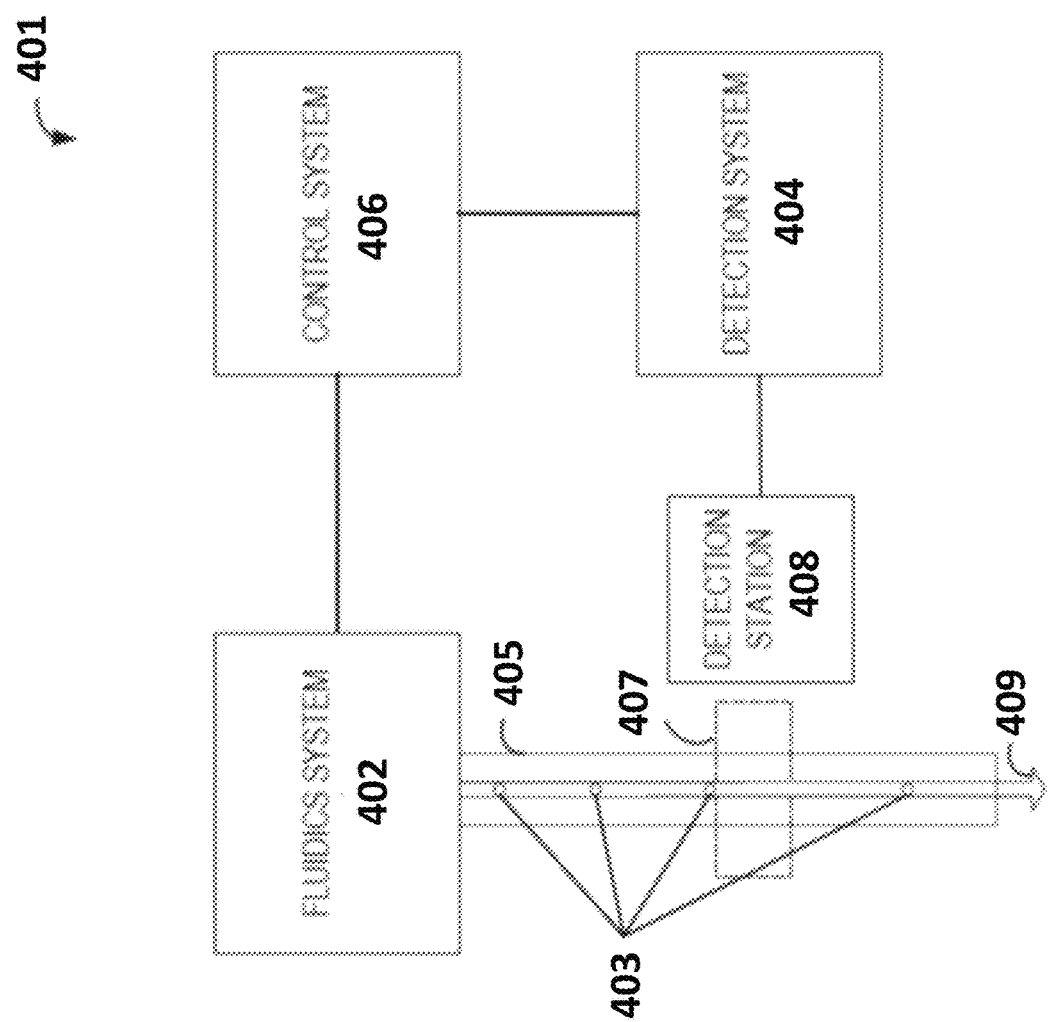
FIG. 4A depicts a functional block diagram of a particle analysis system for computational based sample analysis and particle characterization according to certain embodiments.

In some embodiments, systems are particle analyzers where the 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
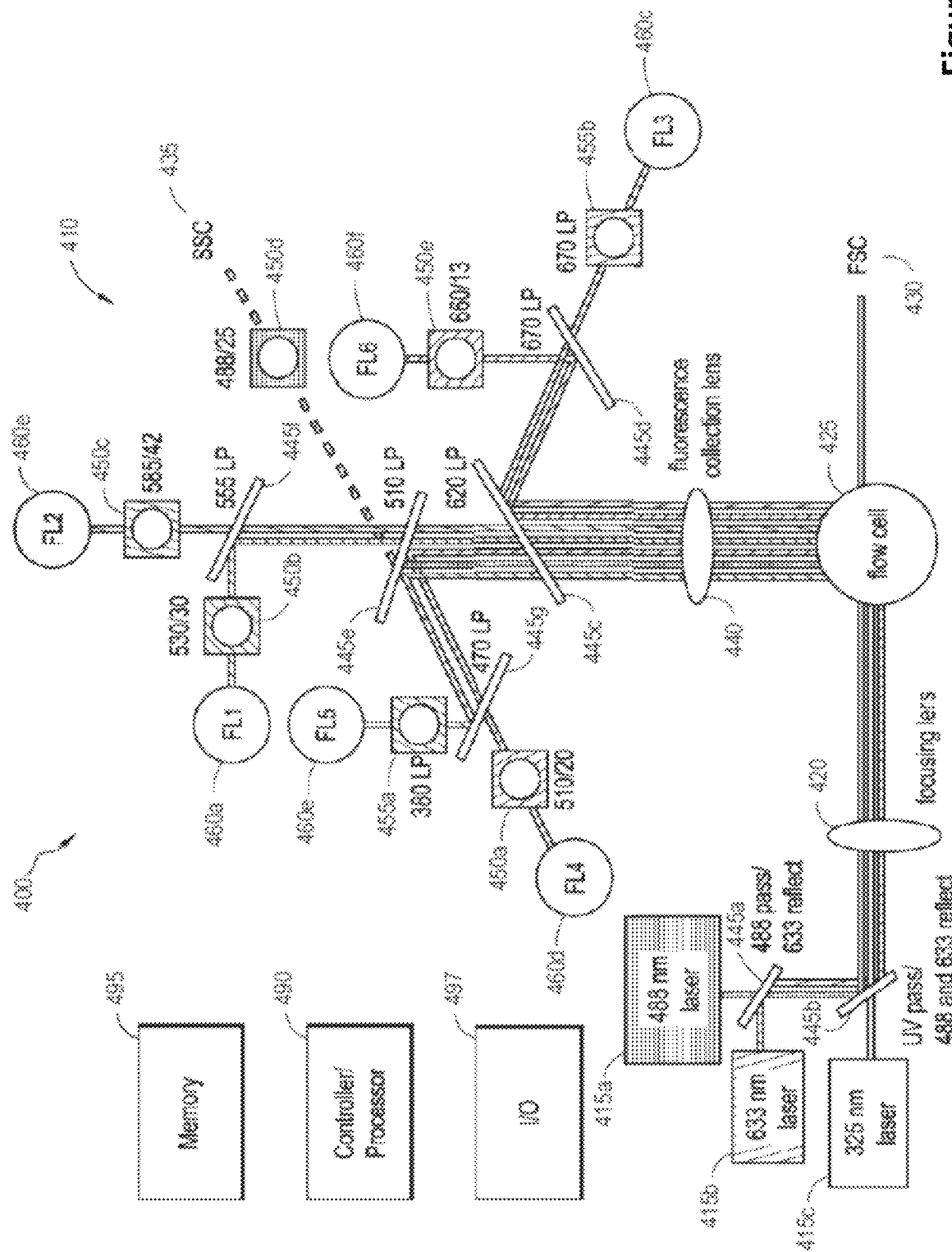
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
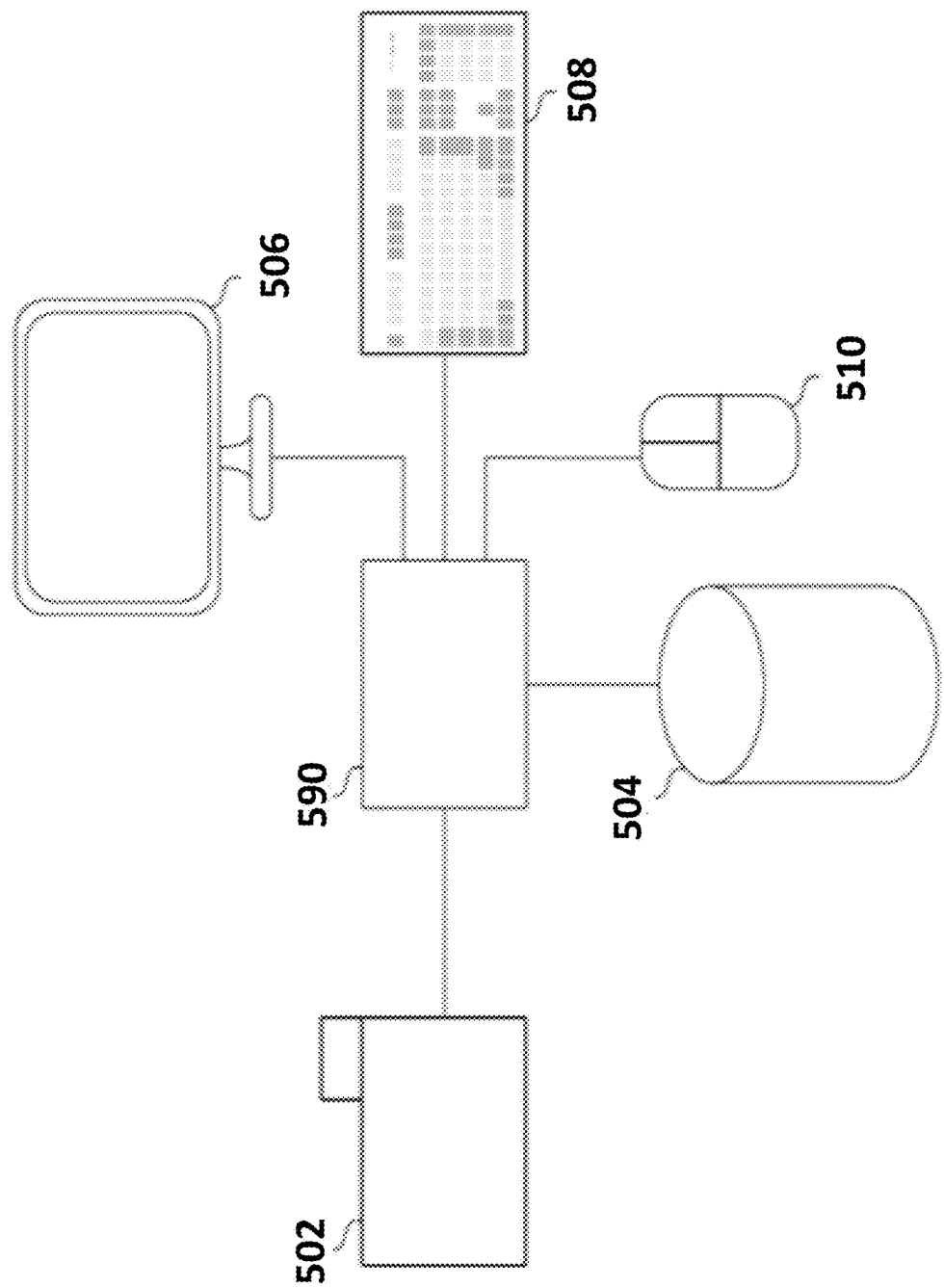
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer 502 can be configured to acquire biological event data. For example, a flow cytometer can generate flow cytometric event data. The particle analyzer 502 can be configured to provide biological event data to the analytics controller 500. A data communication channel can be included between the particle analyzer 502 and the analytics controller 500. The biological event data can be provided to the analytics controller 500 via the data communication channel.

The analytics controller 500 can be configured to receive biological event data from the particle analyzer 502. The biological event data received from the particle analyzer 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Computer-Controlled Systems

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a particle in a flow stream with a frequency-modulated beam of laser light modulated at a reference frequency, instructions for detecting scattered light from the particle with a photodetector, instructions for generating a frequency-encoded data signal from the detected scattered light and instructions for synchronizing the frequency-encoded data signal with the reference frequency. In certain embodiments, the computer readable storage medium includes instructions for determining one or more parameters of the particle based on the synchronized frequency-encoded data signal.

In certain instances, systems include a computer having a computer readable storage medium with a computer program stored thereon, where the computer program when loaded on the computer further includes instructions for irradiating an optical modulator, such as an electro-optic modulator, a piezo optic modulator or an acousto-optic modulator device to generate the frequency-modulated beam of laser light. In some embodiments, the computer program includes instructions for applying an electric current or electric filed to an electro-optic modulator to generate the frequency-modulated beam of laser light. In certain embodiments, the computer program includes instructions for applying an electric current or electric filed to an electro-optic modulator to generate a frequency-modulated beam of light having an oscillating frequency of about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some instances, the computer program includes instructions for generating a reference frequency signal for the optical modulator, such as where the reference frequency signal has an oscillating frequency of about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, systems include a computer having a computer readable storage medium with a computer program stored thereon, where the computer program when loaded on the computer further includes instructions for synchronizing the frequency-encoded data signal with the reference frequency. In some embodiments, the computer program includes instructions for synchronizing the frequency-encoded data signal with the reference frequency by multiplying the frequency-encoded data signal with the reference frequency waveform. In some instances, the computer program includes instructions for synchronizing the frequency-encoded data signal with the reference frequency with a lock-in amplifier. In other embodiments, the computer program includes instructions for digitally synchronizing the frequency-encoded data signal, such as with an FPGA having programming for multiplying the frequency-encoded data signal with the reference frequency waveform. In some embodiments, the computer program includes instructions for applying a low-pass filter to the synchronized frequency-encoded data signal to generate a data signal profile. In some instances, the data signal profile generated by applying the low-pass filter has a Gaussian signal profile. In other instances, the data signal profile generated by applying the low-pass filter has a super-Gaussian signal profile.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Figure 6:
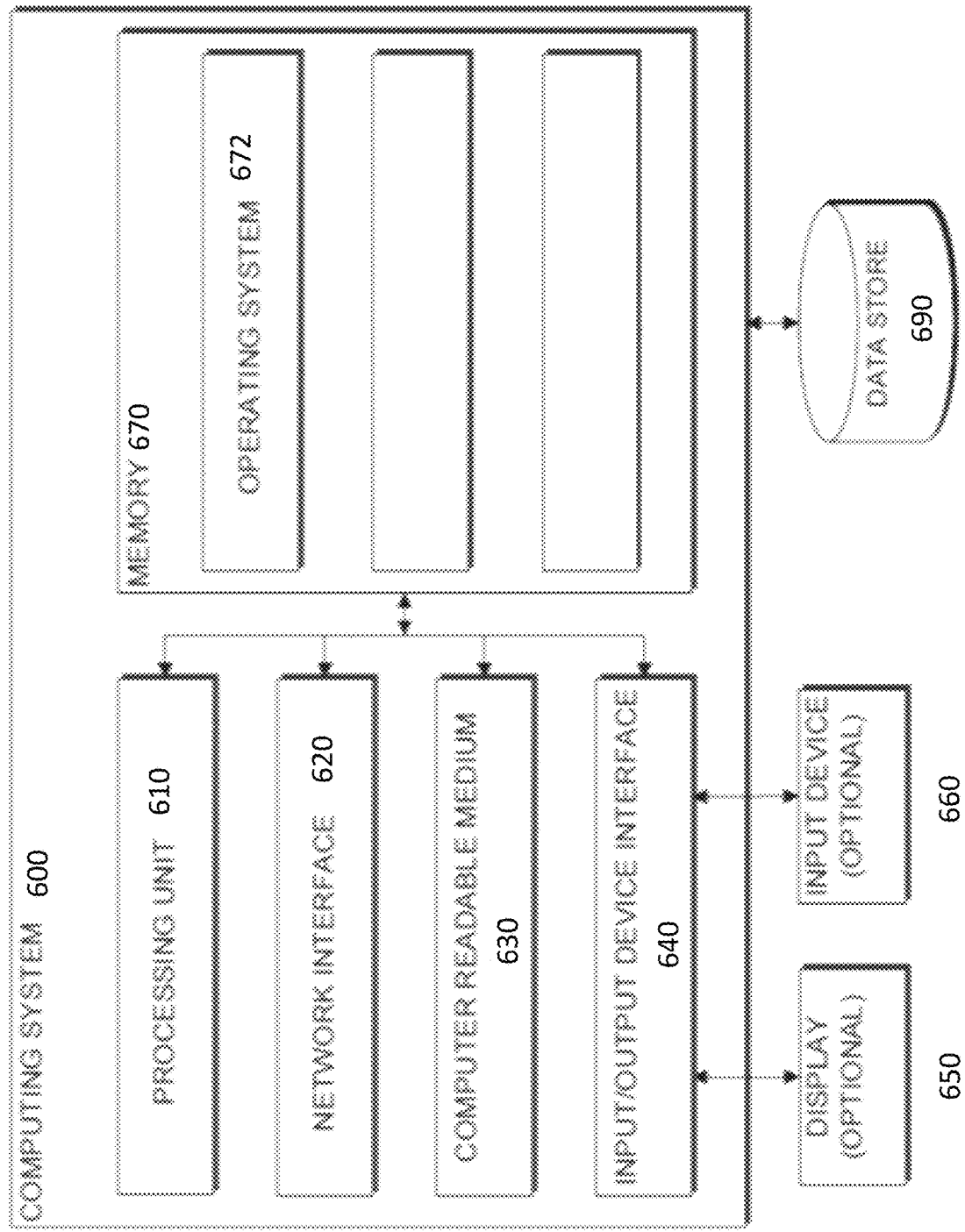
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. The computing device 600 may include many more (or fewer) elements than those shown in FIG. 6. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. The input/output device interface 840 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. The memory 670 may further include computer program instructions and other information for implementing aspects of the present disclosure.

Non-Transitory Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the methods described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-ft magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having algorithm for irradiating a particle in a flow stream with a frequency-modulated beam of laser light modulated at a reference frequency, algorithm for detecting scattered light from the particle with a photodetector, algorithm for generating a frequency-encoded data signal from the detected scattered light and algorithm for synchronizing the frequency-encoded data signal with the reference frequency. In some embodiments, the non-transitory computer readable storage medium includes algorithm for determining one or more parameters of the particle based on the synchronized frequency-encoded data signal.

In some embodiments, the non-transitory computer readable storage medium includes algorithm for irradiating an optical modulator, such as an electro-optic modulator, a piezo optic modulator or an acousto-optic modulator device to generate the frequency-modulated beam of laser light. In some embodiments, the non-transitory computer readable storage medium includes algorithm for applying an electric current or electric filed to an electro-optic modulator to generate the frequency-modulated beam of laser light. In certain embodiments, the non-transitory computer readable storage medium includes algorithm for applying an electric current or electric filed to an electro-optic modulator to generate a frequency-modulated beam of light having an oscillating frequency of about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some instances, the non-transitory computer readable storage medium includes algorithm for generating a reference frequency signal for the optical modulator, such as where the reference frequency signal has an oscillating frequency of about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, the non-transitory computer readable storage medium includes algorithm for synchronizing the frequency-encoded data signal with the reference frequency. In some embodiments, the computer program includes instructions for synchronizing the frequency-encoded data signal with the reference frequency by multiplying the frequency-encoded data signal with the reference frequency waveform. In some instances, the non-transitory computer readable storage medium includes algorithm for synchronizing the frequency-encoded data signal with the reference frequency with a lock-in amplifier. In other embodiments, the non-transitory computer readable storage medium includes algorithm for digitally synchronizing the frequency-encoded data signal, such as with an FPGA having programming for multiplying the frequency-encoded data signal with the reference frequency waveform. In some embodiments, the non-transitory computer readable storage medium includes algorithm for applying a low-pass filter to the synchronized frequency-encoded data signal to generate a data signal profile. In some instances, the data signal profile generated by applying the low-pass filter has a Gaussian signal profile. In other instances, the data signal profile generated by applying the low-pass filter has a super-Gaussian signal profile.

In some embodiments, the non-transitory computer readable storage medium includes algorithm for determining one or more parameters of an irradiated particle in a flow stream from synchronized frequency-modulated data signals. In some embodiments, the non-transitory computer readable storage medium includes algorithm for identifying the particle based on the one or more determined parameters of the particle. In other embodiments, the non-transitory computer readable storage medium includes algorithm for sorting the particle based on the one or more determined parameters of the particle.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the invention further include kits, where kits include a laser, an optical modulator and one or more light polarizers. In some embodiments, the optical modulator is an electro-optic modulator. In other embodiments, the optical modulator is a piezo-optic modulator. In still other embodiments, the optical modulator is an acousto-optic modulator. Kits may further include an optical adjustment component such as a mirror or beam splitter for conveying light from the flow stream to a scatter photodetector. In certain embodiments, kits include a lock-in amplifier. In some instances, kits also include an integrated circuit such as a field programmable gate array having programming for synchronizing the generated frequency-encoded data signal with the reference frequency signal from the optical modulator. In certain embodiments, kits include one or more components of a light beam generator, such as a waveform pulse generator, a direct digital synthesizer, an acousto-optic deflector, a beam combining lens and a Powell lens.

The various assay components of the kits may be present in separate containers, or some or all of them may be pre-combined. For example, in some instances, one or more components of the kit, e.g., one or more scatter photodetectors, a laser, an optical modulator are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods, and computer systems find use in a variety of applications where it is desirable to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject systems provide fully automated protocols so that adjustments to a flow cytometer during use require little, if any, human input.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for determining a parameter of a particle in a flow stream in a particle analyzer, the method comprising:
    irradiating through an input polarizer an electro-optical modulator with a laser to generate a polarized frequency-modulated beam of laser light;
    irradiating a particle in a flow stream in the particle analyzer with the polarized frequency-modulated beam of laser light modulated at a reference frequency;
    generating a reference frequency signal comprising a reference waveform
    detecting scattered light from the particle conveyed through an output polarizer with a photodetector;
    generating a frequency-encoded data signal from the detected polarized scattered light from the photodetector;
    synchronizing the frequency-encoded data signal with the reference frequency to produce a synchronized frequency-encoded data signal by multiplying the frequency-encoded data signal with the reference waveform; and
    determining one or more parameters of the particle based on the synchronized frequency-encoded data signal.

2. The method according to claim 1, wherein the electro-optical modulator is a piezo optic modulator.

3. The method according to claim 1, wherein the output polarizer comprises a quarter waveplate.

4. The method according to claim 1, wherein generating the frequency-encoded data signal comprises detecting the amplitude of light scattered by the particle that is oscillating at the reference frequency.

5. The method according to claim 1, wherein the frequency-encoded data signal is synchronized with the reference frequency with a lock-in amplifier.

6. The method according to claim 5, wherein lock-in amplification is implemented on a field programmable gate array (FPGA).

7. The method according to claim 1, wherein the frequency-encoded data signal is digitally synchronized with the reference frequency.

8. The method according to claim 1, wherein the method further comprises applying a low-pass filter to the synchronized frequency-encoded data signal to generate a data signal profile.

9. The method according to claim 1, wherein the particle analyzer is part of a flow cytometer.

10. The method according to claim 9, wherein the method further comprises identifying the particle based on one or more of the determined parameters of the particle.

11. The method according to claim 9, wherein the method further comprises sorting the particle based on one or more of the determined parameters of the particle.

12. The method according to claim 1, wherein the method comprises:
    irradiating an optical frequency modulator with the laser to generate the frequency-modulated beam of laser light; and
    synchronizing the frequency-encoded data signal from the detected scattered light from the photodetector with the frequency of the irradiated optical frequency modulator.

13. A method comprising:
    irradiating through an input polarizer an electro-optical modulator with a laser to generate a polarized frequency-modulated beam of laser light;
    irradiating a particle in a flow stream in a particle analyzer with the polarized frequency-modulated beam of laser light modulated at a reference frequency;
    generating a reference frequency signal comprising a reference waveform
    detecting scattered light from the particle conveyed through an output polarizer with a photodetector;
    generating a frequency-encoded data signal from the detected polarized scattered light from the photodetector;
    synchronizing the frequency-encoded data signal with the reference frequency to produce a synchronized frequency-encoded data signal by multiplying the frequency-encoded data signal with the reference waveform.

14. The method according to claim 13, wherein the method comprises:
    irradiating an optical frequency modulator with the laser to generate the frequency-modulated beam of laser light; and
    synchronizing the frequency-encoded data signal from the detected scattered light from the photodetector with the frequency of the irradiated optical frequency modulator.

* * * * *